United States Patent
Takenaka

Patent Number: 5,841,258
Date of Patent: Nov. 24, 1998

[54] REMOTE CONTROL SYSTEM FOR LEGGED MOVING ROBOT

[75] Inventor: Toru Takenaka, Wako, Japan

[73] Assignee: Honda Giken Kogyo Kabushiki Kaisha, Tokyo, Japan

[21] Appl. No.: 17,373

[22] Filed: Feb. 2, 1998

[30] Foreign Application Priority Data

Jan. 31, 1997 [JP] Japan .................................. 9-018468

[51] Int. Cl.⁶ .............................. B25J 13/04; G05D 3/12
[52] U.S. Cl. ...................................... 318/568.12; 318/675
[58] Field of Search ................................ 318/567, 568.1, 318/568, 11, 568.12, 628, 675; 901/1, 2, 3, 6, 8

[56] References Cited

U.S. PATENT DOCUMENTS

| | | |
|---|---|---|
| 4,046,262 | 9/1977 | Vykukal et al. . |
| 5,038,089 | 8/1991 | Szakaly ............................ 318/568.11 |
| 5,382,885 | 1/1995 | Salcudean et al. ................ 318/568.11 |

FOREIGN PATENT DOCUMENTS 08216066A 8/1996 Japan .

*Primary Examiner*—Bentsu Ro
*Attorney, Agent, or Firm*—Lyon & Lyon LLP

[57] ABSTRACT

A remote control system for remotely controlling a legged moving robot has a master unit for manipulating the legged moving robot in a master-slave configuration. The master unit has a foot support mechanism for movably supporting an operator's foot, an actuating device for actuating the foot support mechanism, an upper body support mechanism for supporting an operator's upper body, and a master foot acting force detector for detecting forces acting on the operator's foot. The legged moving robot has a robot foot acting force detector for detecting forces acting on a robot's foot from a floor, and a leg actuating device. The remote control system has a foot position/orientation controller for determining a target position and/or orientation for the operator's foot with respect to the operator's upper body and a target position and/or orientation for the robot's foot with respect to the robot's upper body, based on the forces detected by the master and robot foot acting force detectors, in order to associate the forces acting on the operator's foot and the forces acting on the robot's foot with respect to each other in a predetermined relationship, controlling the foot support mechanism with the foot support mechanism actuating device according to the determined target positions and/or orientations for the operator's foot and the robot's foot, and controlling the leg actuating device.

6 Claims, 12 Drawing Sheets

OPERATION SEQUENCE OF LEG BILATERAL MAIN CONTROLLER

OPERATION SEQUENCE OF ROBOT LEG
MAIN CONTROLLER
(COMPLIANCE CONTROL)

REMOTE CONTROL SYSTEM FOR LEGGED MOVING ROBOT

BACKGROUND OF THE INVENTION

1. Field of the Invention

The present invention relates to a remote control system for a legged moving robot, and more particularly to a remote control system for remotely controlling a legged moving robot in a master-slave configuration.

2. Description of the Prior Art

One known remote control system for remotely controlling a legged moving robot comprises a body-mounted master unit that is worn by the operator and has joints identical to those of the legged moving robot, as disclosed in Japanese laid-open patent publication No. 8-216066. When the operator moves the joints of the master unit in a predetermined pattern, the joints of the legged moving robot are operated in the same pattern as the pattern of movement of the joints of the master unit, and simultaneously, the joints of the master unit are moved depending on the movement of the joints of the legged moving robot. Therefore, the master unit and the legged moving robot are moved in the same pattern with the same orientation based on so-called symmetrical bilateral master-slave principles. The symmetrical bilateral master-slave system controls the legged moving robot such that the angles through which the joints of the legged moving robot are angularly moved and the drive torques applied to the joints of the legged moving robot are proportional to the angles through which the joints of the legged moving robot are angularly moved and the drive torques applied to the joints of the legged moving robot.

For manipulating the robot with the above remote control system, the operator needs to operate, through his own actions, the robot stably while preventing the robot from falling over. Therefore, it is desirable that the operator accurately recognize the stability or instability of the robot as his own stability or instability for thereby taking proper actions to keep the robot stable. In order to meet such a demand, it is preferable that when the operator manipulates the robot, the feet of the robot and the feet of the operator receive the same forces acting thereon.

According to findings of the inventors, while human beings are walking, they recognize their stability or instability and are conscious of the sensation of a force acting from the ground on the feet, i.e., the sensation of which part of the feet is receiving a greatest force, rather than the sensation of bends of joints of their legs and forces acting on the joints, for keeping their stability.

For example, when the upper body or torso of a human being is tilted under predetermined external forces, the human being recognizes its instability based on an increased force acting on the foot toward which the upper body is tilted, and makes a conscious effort in a manner to further increase the force acting on the foot for thereby maintaining its stability.

When a human being steps on an object while walking, the human being recognizes the presence of the object based on a force acting on the foot at a position where the foot contacts the object. Then, the human being makes a conscious effort in a manner to receive a force on the foot which is strong enough to eliminate its instability caused by the object.

For the operator who manipulates a robot to make accurate actions to keep the robot stable, it is preferable that the feet of the robot and the feet of the operator receive the same force acting thereon when the robot is manipulated by the operator.

According to the symmetrical bilateral masterslave configuration disclosed in Japanese laid-open patent publication No. 8-216066, the legged moving robot is simply controlled such that the angles through which the joints of the legged moving robot are angularly moved and the drive torques applied to the joints of the legged moving robot are proportional to the angles through which the joints of the legged moving robot are angularly moved and the drive torques applied to the joints of the legged moving robot. Therefore, inertial and frictional forces of actuators which actuate the joints of the master unit and the robot and also inertial forces of link mechanisms between the joints of the robot and the master unit are transmitted to the operator. As a result, it is difficult to give the operator the sensation of the same force as the force acting on the feet of the robot, and also to give the feet of the robot the same force as the force which the operator intends to apply to the feet.

The body-mounted master unit which has no mechanism for supporting the torso of the operator in the symmetrical bilateral master-slave system fails to operate the robot in various different floor shape environments. For example, for controlling the robot to walk up and down a stair, the operator who wears the master unit needs to walk up and down a similar stair. Therefore, the master unit requires a separate stair in the same environment as is the case with the robot. However, attempts to provide the master unit with as many different floor shape environments as the number of floor shape environments in which to operate the robot would necessitate huge investments in facilities and a large space. Actually, it has been difficult to operate the robot in a wide variety of different floor shape environments.

SUMMARY OF THE INVENTION

It is therefore an object of the present invention to provide a remote control system for remotely controlling a legged moving robot by causing robot feet and operator feet to receive the same force acting thereon while keeping the position and/or orientation of the operator feet with respect to the operator's upper body and the position and/or orientation of the robot feet with respect to the robot's upper body in a predetermined relationship to each other.

Another object of the present invention is to provide a remote control system for remotely controlling a legged moving robot by allowing the operator to manipulate the robot accurately for maintaining robot stability and also to operate the robot in a wide variety of different floor shape environments.

To achieve the above objects, there is provided in accordance with the present invention a remote control system for remotely controlling a legged moving robot, comprising a master unit for manipulating the legged moving robot in a master-slave configuration, the master unit having a foot support mechanism for movably supporting a foot of an operator, a foot support mechanism actuating device for actuating the foot support mechanism, an upper body support mechanism for supporting an upper body of the operator, and master foot acting force detecting means for detecting forces acting on the foot of the operator, the legged moving robot having robot foot acting force detecting means for detecting forces acting on a foot of the legged moving robot from a floor, and a leg actuating device, and foot position/orientation control means for determining a target position and/or orientation for the foot of the operator with respect to the upper body thereof and a target position and/or orientation for the foot of the robot with respect to the upper body thereof, based on the forces detected by the master foot acting force detecting means and the forces detected by the robot foot acting force detecting means, in order to associate the forces acting on the foot of the operator and the forces acting on the foot of the legged moving robot with respect to each other in a predetermined relationship, controlling the foot support mechanism with the foot support mechanism actuating device according to the determined target position and/or orientation for the foot of the operator and the determined target position and/or orientation for the foot of the robot, and controlling the leg actuating device of the legged moving robot.

When the legged moving robot is manipulated by the operator, the forces acting on the foot of the operator whose upper body and foot are supported respectively by the upper body support mechanism and the foot support mechanism and the forces acting on the foot of the legged moving robot are detected respectively by the master foot acting force detecting means and the robot foot acting force detecting means. Based on the detected forces, the foot position/orientation control means determines a target position and/or orientation for the foot of the operator with respect to the upper body thereof and a target position and/or orientation for the foot of the robot with respect to the upper body thereof in order to associate the forces acting on the foot of the operator and the forces acting on the foot of the legged moving robot with each other. According to the determined target positions and/or orientations, the foot support mechanism of the master unit and the foot of the robot are controlled respectively by the foot support mechanism actuating device and the leg actuating device.

Since the target position and/or orientation for the foot of the operator with respect to the upper body thereof and the target position and/or orientation for the foot of the robot with respect to the upper body thereof are determined such that they are associated with each other, floor configurations in the environment in which the legged moving robot operates are reflected in the relative position and/or orientation of the foot of the operator with respect to the upper body thereof.

The remote control system allows the foot of the robot and the foot of the operator to be in the same position and/or orientation with respect to their upper bodies and also to receive the same acting forces. The operator can thus accurately manipulate the legged moving robot to keep the robot stable, and operates the legged moving robot in a variety of floor configurations.

The position and orientation of the foot of the legged moving robot are determined by the quantities of operation of actuators of the leg actuating device. Therefore, determining the target position and/or orientation for the foot of the legged moving robot includes determining target quantities of operation for the actuators of the leg actuating device.

Preferably, the upper body support mechanism is disposed for movement in unison with the upper body of the operator, the master unit having an upper body support mechanism actuating device for actuating the upper body support mechanism, the legged moving robot having orientation tilt detecting means for detecting an orientation tilt of the upper body of the legged moving robot, and the remote control system further comprises master upper body position/orientation control means for determining a target position and/or orientation for the upper body of the operator supported by the upper body support mechanism based on the orientation tilt of the upper body of the legged moving robot which is detected by the orientation tilt detecting means, in order to achieve an orientation tilt of the upper body of the operator depending on the orientation tilt of the upper body of the legged moving robot, and controlling the upper body support mechanism with the upper body support mechanism actuating device according to the determined target position and/or orientation for the upper body of the operator.

The orientation tilt of the upper body of the legged moving robot is detected by the orientation tilt detecting means, and the master upper body position/orientation control means determines a target position and/or orientation for the upper body of the operator in order to achieve an orientation tilt of the upper body of the operator depending on the detected orientation tilt of the upper body of the legged moving robot. The upper body support mechanism is controlled with the upper body support mechanism actuating device according to the determined target position and/or orientation for the upper body of the operator. Therefore, the orientation tilt of the upper body of the operator is controlled at the operation tilt of the legged moving robot. Therefore, the operator receives the same forces acting on its foot as the forces acting on the foot of the robot while being kept at the same orientation tile as the robot. The operator can thus accurately recognize how the robot is stable or unstable in unison with the robot, and can adjust the orientation and position of its own foot to keep the robot stable for reliably manipulating the robot for maintaining the robot stable.

Specifically, the foot position/orientation control means comprises means for determining a translation speed and/or rotation speed of the foot of the legged moving robot, from time to time, depending on a deviation from the predetermined relationship in which the forces detected by the master foot acting force detecting means and the forces detected by the robot foot acting force detecting means are associated with each other, determining a target position and/or orientation for the foot of the legged moving robot based on the translation speed and/or rotation speed, and determining a target position and/or orientation for the foot of the operator which corresponds to the determined target position and/or orientation for the foot of the legged moving robot.

Alternatively, the foot position/orientation control means comprises means for determining a translation speed and/or rotation speed of the foot of the operator, from time to time, depending on a deviation from the predetermined relationship in which the forces detected by the master foot acting force detecting means and the forces detected by the robot foot acting force detecting means are associated with each other, determining a target position and/or orientation for the foot of the operator based on the translation speed and/or rotation speed, and determining a target position and/or orientation for the foot of the legged moving robot which corresponds to the determined target position and/or orientation for the foot of the operator.

Further alternatively, the foot position/orientation control means comprises means for determining a translation speed and/or rotation speed of the foot of the legged moving robot and a translation speed and/or rotation speed of the foot of the operator, from time to time, depending on a deviation from the predetermined relationship in which the forces detected by the master foot acting force detecting means and the forces detected by the robot foot acting force detecting means are associated with each other, and determining a target position and/or orientation for the foot of the legged moving robot and a target position and/or orientation for the foot of the operator based on the translation speed and/or rotation speed of the foot of the legged moving robot and the translation speed and/or rotation speed of the foot of the operator.

Since a translation speed and/or rotation speed of the foot of the legged moving robot and a translation speed and/or rotation speed of the foot of the operator are determined, from time to time, depending on a deviation from the predetermined relationship in which the forces detected by the master foot acting force detecting means and the forces detected by the robot foot acting force detecting means are associated with each other, and a target position and/or orientation for the foot of the legged moving robot and a target position and/or orientation for the foot of the operator are determined based on the translation speed and/or rotation speed of the foot of the legged moving robot and the translation speed and/or rotation speed of the foot of the operator, the forces acting on the feet of the operator and the robot, and the positions and/or orientations of the feet of the operator and the robot can accurately be controlled so as to be associated with each other.

Further preferably, the legged moving robot has means for correcting the position and/or orientation of the foot of the legged moving robot according to a compliance control process in order to associate the forces acting on the foot of the operator and the forces acting on the foot of the legged moving robot with respect to each other in the predetermined relationship, depending on a deviation from the predetermined relationship in which the forces detected by the master foot acting force detecting means and the forces detected by the robot foot acting force detecting means are associated with each other.

Because the legged moving robot has means for correcting the position and/or orientation of the foot of the legged moving robot according to a compliance control process in order to associate the forces acting on the foot of the operator and the forces acting on the foot of the legged moving robot with respect to each other in the predetermined relationship, the legged moving robot can control, autonomously to a certain extent, the position and/or orientation of its own foot to associate the forces acting on the foot of the robot with the forces acting on the foot of the operator. Consequently, the forces acting on the foot of the operator and the forces acting on the foot of the legged moving robot can be controlled more quickly so as to be associated with respect to each other in the predetermined relationship.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
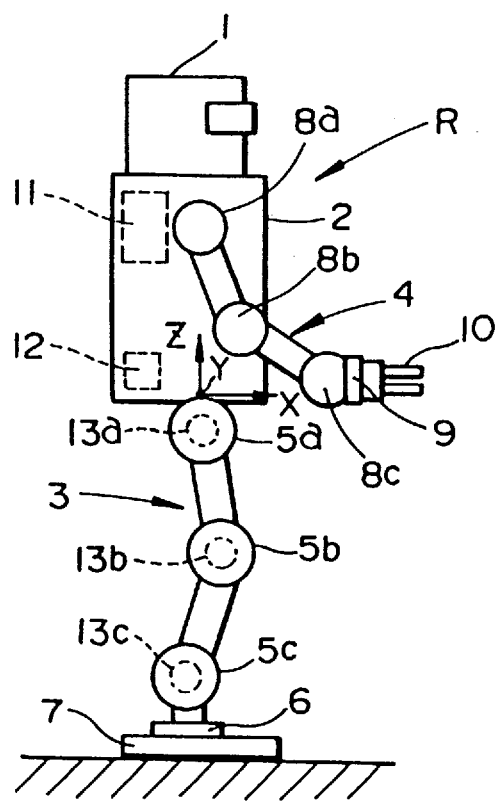
FIG. 1 is a schematic side elevational view of a legged moving robot controlled by a remote control system according to a first embodiment of the present invention.

Like or corresponding parts are denoted by like or corresponding reference characters throughout views.

Figure 2:
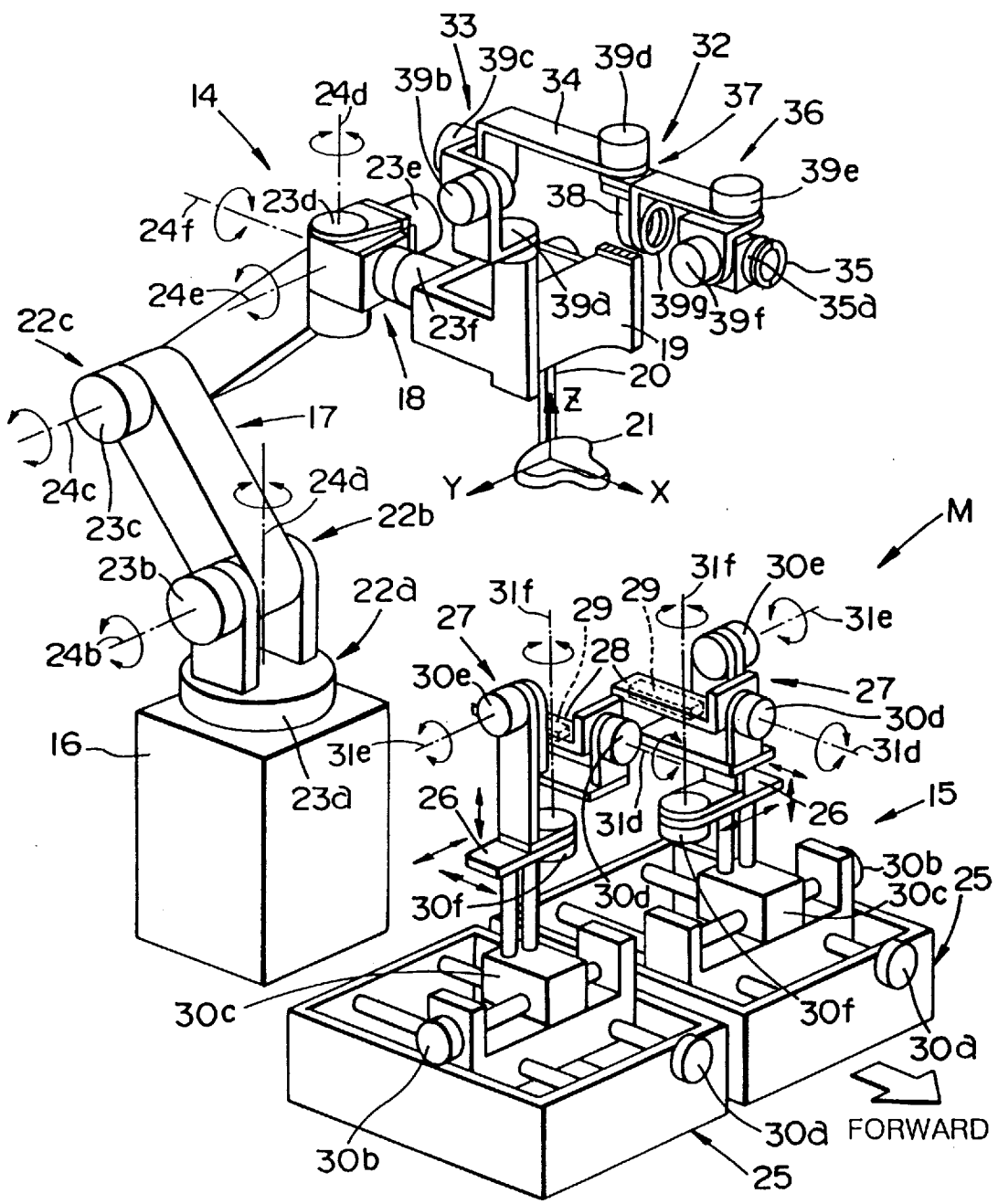
FIG. 2 is a perspective view of a master unit of the remote control system according to the first embodiment of the present invention.

FIGS. 1 and 2 show, respectively, a legged moving robot R controlled by a remote control system according to a first embodiment of the present invention, and a master unit M of the remote control system according to the first embodiment of the present invention with the legged moving robot serving as a slave unit.

As shown in FIG. 1, the legged moving robot R comprises a biped (two-legged) walking robot having a torso 2 supporting a head 1 on its upper end, a pair of legs 3 (only one shown) extending downwardly from a lower end of the torso 2, and a pair of arms 4 (only one shown) extending from respective upper lateral sides of the torso 2.

Each of the legs 3 has a hip joint actuator 5a at a hip joint between the torso 2 and the leg 3, a knee joint actuator 5b at a knee joint, and an ankle joint actuator 5c at an ankle joint. A foot 7 for contacting a floor is operatively connected through a six-axis force sensor (robot foot force detecting means) 6 to a lower end of the ankle joint actuator 5c. The hip joint actuator 5a serves to rotate the leg 3 about three axes, i.e., a sagittal axis, a lateral axis, and a vertical axis. The knee joint actuator 5b serves to rotate the knee joint about the lateral axis. The ankle joint actuator 5c serves to rotate the ankle joint about the sagittal axis and the lateral axis. The hip, knee, and ankle joint actuators 5a, 5b, 5c are activated to move the foot 7 with six degrees of freedom. The six-axis force sensor 6 serves to detect forces acting on the foot 7, i.e., force components applied to the robot R along the sagittal, lateral, and vertical axes, and moments generated about these axes. The hip, knee, and ankle joint actuators 5a, 5b, 5c jointly make up a leg actuating device.

Each of the arms 4 has a shoulder joint actuator 8a at a shoulder joint between the torso 2 and the arm 4, an elbow joint actuator 8b at an elbow joint, and a wrist joint actuator 8c at a wrist joint. A hand 10 is operatively connected through a six-axis force sensor 9 to the wrist joint actuator 8c. The shoulder joint actuator 8a serves to rotate the arm 4 about the sagittal axis, the lateral axis, and the vertical axis. The elbow joint actuator 8b serves to rotate the elbow joint about the lateral axis. The wrist joint actuator 8c serves to rotate the wrist joint about the sagittal axis, the lateral axis, and the vertical axis.

The torso 2 houses therein a robot control unit 11 for activating and controlling the actuators 5a~5c, 8a~8c, and a tilt detector (orientation detecting means) 12 for detecting a tilted orientation of the robot R which is indicative of an upper body (torso) orientation of the robot R. The robot control unit 11 and the tilt detector 12 will be described in detail later on. The actuators 5a~5c are associated respectively with actuator displacement detectors 13a~13c for detecting angular displacements of the respective actuators 5a~5c about the appropriate axes. Similarly, the actuators 8a~8c are associated respectively with actuator displacement detectors (not shown) for detecting angular displacements of the respective actuators 8a~8c about the appropriate axes. The actuators 5a~5c that are associated with the legs 3 will hereinafter also be referred to collectively as leg actuators 5, and the corresponding actuator displacement detectors 13a~13c as actuator displacement detectors 13.

As shown in FIG. 2, the master unit M comprises an upper body support mechanism 14 for movably supporting the upper body (torso) of an operator. (not shown) and a foot support mechanism 15 for movably supporting the feet of the operator.

The upper body support mechanism 14 serves to give the upper body of the operator a tilted orientation which is identical to a tilted orientation of the robot R according to a control process (described later on) when the robot R is manipulated by the operator. The upper body support mechanism 14 comprises a link arm 17 extending from a fixed base 16, a back holder 19 mounted on a distal end of the link arm 17 by a three-axis rotary mechanism 18, and a saddle 21 mounted on a lower end of a post 20 extending downwardly from a lower end of the back holder 19. In use, the operator is seated on the saddle 21 with its back held against the back holder 19. The torso of the operator is fastened to the back holder 19 by a belt (not shown).

The link arm 17 has three joints 22a, 22b, 22c, and is rotatable about axes 24a, 24b, 24c of the respective joints 22a, 22b, 22c by actuators 23a, 23b, 23c that are combined with the joints 22a, 22b, 22c. The axis 24a is a vertical axis, and the axes 24b, 24c are lateral axes.

The three-axis rotary mechanism 18 has three actuators 23d, 23e, 23f, and is rotatable about axes 24d, 24e, 24f by the respective actuators 23d, 23e, 23f. The axes 24d, 24e, 24f comprise vertical, lateral, and sagittal axes, respectively.

The upper body support mechanism 14 supports the upper body of the operator seated on the saddle 21 with the back holder 19 holding the back of the operator and with the belt (not shown) fastening the torso of the operator to the back holder 19. When the actuators 23a~23f (hereinafter referred to collectively as master upper body actuators 23) are operated, the upper body of the operator is moved into a desired position/orientation in unison with the back holder 19 and the saddle 21.

The master upper body actuators 23 jointly make up an upper body supporting mechanism actuating device. The master upper body actuators 23 are associated with respective actuator displacement detectors 23x (see FIG. 3) for detecting angular displacements thereof.

The foot support mechanism 15 serves to basically control the feet 7 of the robot R and the feet of the operator to operate in the same manner as each other according to a control process (described later on) when the robot R is manipulated by the operator. The foot support mechanism 15 comprises a pair of three-axis moving tables (XYZ moving tables) 25 positioned substantially below the saddle 21 for the respective feet of the operator, and a pair of foot support bases 28 mounted on respective three-axis moving members 26 of the three-axis moving tables 25 by respective three-axis rotating mechanisms 27. The foot support bases 28 serve to support the respective feet of the operator whose upper body is supported by the upper body support mechanism 14. The foot support bases 28 house therein respective six-axis force sensors (master foot force detecting means) 29 for detecting forces (force components along sagittal, lateral, and vertical axes and moments about these axes) applied from the foot support bases 28 to the feet of the operator which are placed on the foot support bases 28. The feet of the operator which are placed on the foot support bases 28 are fastened to the foot support bases 28 by belts (not shown).

The three-axis moving member 26 of each of the three-axis moving tables 25 is movable along sagittal, lateral, and vertical axes by three actuators 30a, 30b, 30c on the three-axis moving table 25.

Each of the three-axis rotating mechanisms 27 comprises three actuators 30d, 30e, 30f for rotating the foot support base 28 respectively about sagittal, lateral, and vertical axes 31d, 31e, 31f.

When the upper body of the operator is supported by the upper body support mechanism 14, the feet of the operator are placed on the foot support bases 28, respectively, and fastened thereby by the non-illustrated belts, so that the feet of the operator are securely supported on the foot support bases 28. When the actuators 30a~30f (hereinafter referred to collectively as master foot actuators 30) are then operated, the feet of the operator are moved into a desired position/orientation (with six degree of freedom) in unison with the foot support bases 28. Forces applied to the feet of the operator (reactive forces applied in response to forces applied from the feet to the foot support bases 28) are detected by the six-axis force sensors 29.

The master foot actuators 30 jointly make up a foot support mechanism actuating device. The master foot actuators 30 are associated with respective actuator displacement detectors 30x (see FIG. 3) for detecting angular displacements thereof.

The master unit M also has a master arm mechanism 32 for operating the arms 4 of the robot R in the same manner as the arms of the operator when the robot R is manipulated.

The master arm mechanism 32 comprises an arm 34 in the form of a link mechanism extending from the upper end of each of opposite sides of the back holder 19 (which correspond to the shoulders of the operator) through a three-axis rotating mechanism 33. In FIG. 2, only the arm 34 corresponding to the right arm of the operator is illustrated, and the arm 34 corresponding to the right arm of the operator is omitted from illustration.

A wrist support 35 for supporting a wrist of the operator inserted therein is mounted on the distal end of the arm 34 by a three-axis rotating mechanism 36. The arm 34 has a joint 37 disposed on its intermediate portion, and an elbow support 38 for supporting an elbow of the operator inserted therein is mounted on the joint 37. A six-axis force sensor 35a for detecting forces acting from the wrist of the operator to the wrist support.35 is mounted on the wrist support 35. The elbow support 38 houses therein a pressure sensor (not shown) for detecting forces imposed from the elbow of the operator on the elbow support 38.

The three-axis rotating mechanism 33 comprises three actuators 39a, 39b, 39c for rotating the arm 34 about respectively about sagittal, lateral, and vertical axes in the same manner as the arm 4 of the robot R. An actuator 39d is coupled with the joint 37 for rotating the joint 37 about a vertical axis in the same manner as the corresponding elbow joint of the robot R. The three-axis rotating mechanism 36 comprises three actuators 39e, 39f, 39g for rotating the wrist support 35 respectively about vertical, lateral, and sagittal axes in the same manner as the corresponding wrist joint of the robot R.

While the foot support mechanism 15 has the three-axis moving tables 25 and the three-axis rotating mechanisms 27 in this embodiment, the foot support mechanism 15 may alternatively comprise link mechanisms such as six-axis manipulators or the like. Similarly, while the upper body support mechanism 14 has the link arm 17 and the three-axis rotary mechanism 18 in this embodiment, the upper body support mechanism 14 may instead comprise only a link mechanism or a three-axis moving table.

Figure 3:
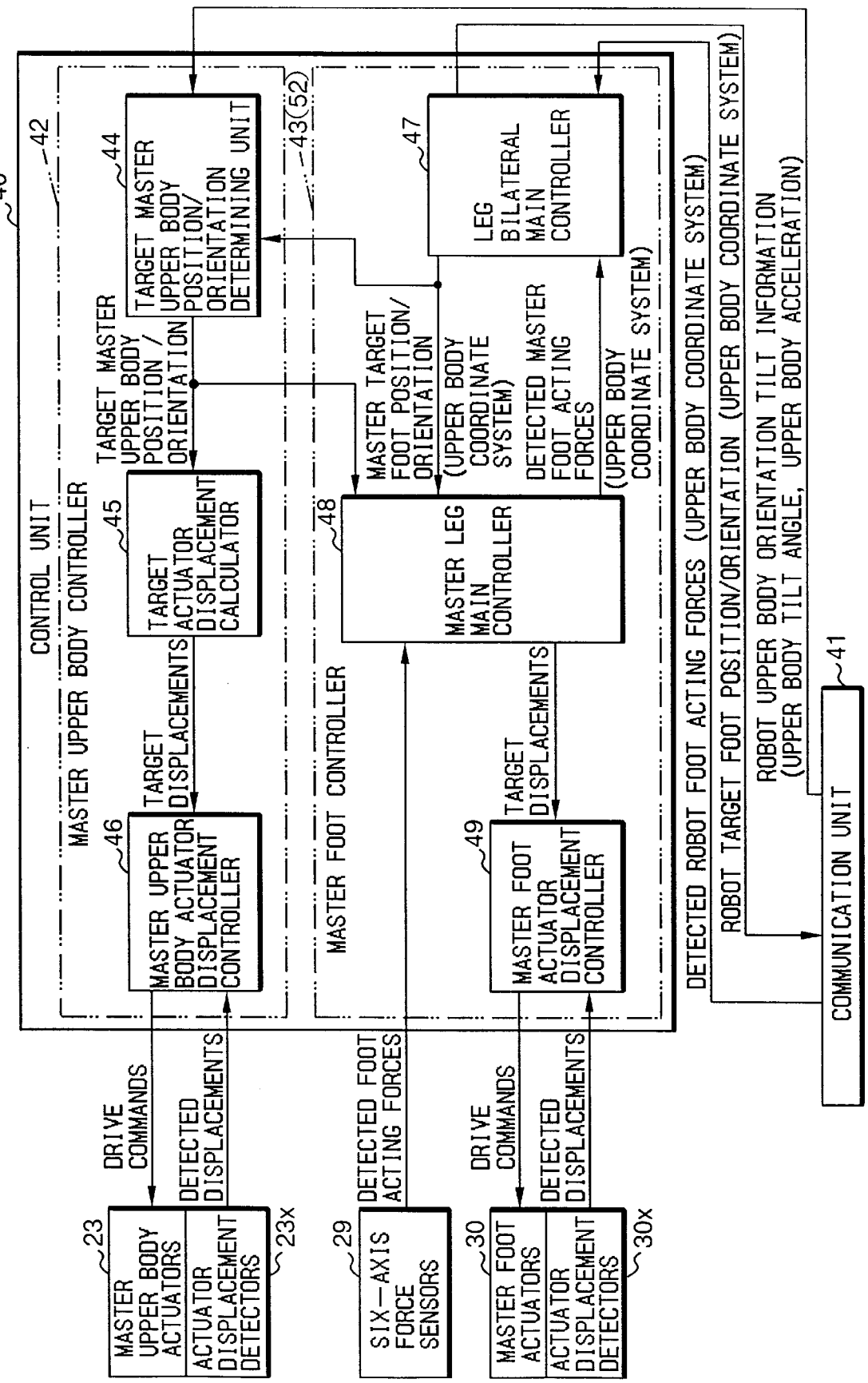
FIG. 3 is a block diagram of a control system section for the master unit shown in FIG. 2.
Figure 4:
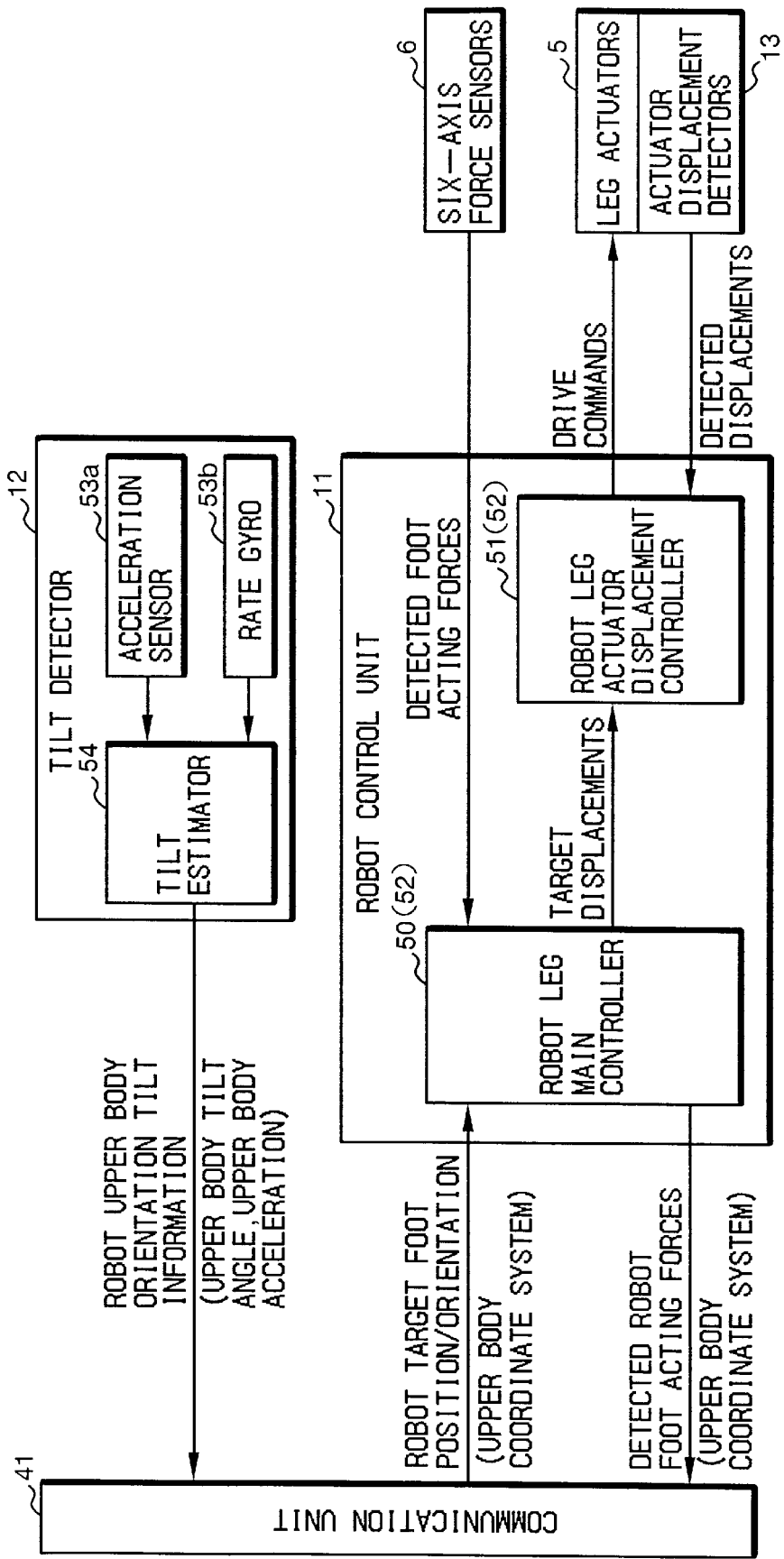
FIG. 4 is a block diagram of a control system section for the legged moving robot shown in FIG. 1.

The remote control system according to the first embodiment of the present invention has control system sections as shown in FIGS. 3 and 4 for controlling the master unit M and the robot R.

Specifically, the remote control system comprises a control unit 40 (see FIG. 3) associated with the master unit M, the control unit 11 (see FIG. 4) associated with the robot R, and a communication unit 41 for effecting communications between the control units 40, 11. Hereinafter, the control unit 40 will be referred to as a master control unit 40, and the control unit 11 as a robot control unit 11. The communication unit 41 may be a wired or wireless communication unit.

The master control unit 40 shown in FIG. 3 comprises a master upper body controller (master upper body position/orientation control means) 42 for controlling operation of the upper body support mechanism 14, and a master foot controller 43 for controlling operation of the foot support mechanism 15 and operation of the feet 7 of the robot R. The master control unit 40 also includes a controller for controlling operation of the master arm mechanisms 32 and operation of the arms 4 of the robot R. However, this controller will not be described in detail below as it has no direct bearing on the present invention.

The master upper body controller 42 comprises a target master upper body position/orientation determining unit 44 for determining a target position/orientation for the upper body of the operator on the master unit M (a target position/orientation for the back holder 19, hereinafter referred to as a target master upper body position/orientation), a target actuator displacement calculator 45 for calculating target displacements (target angular displacements) for the respective master upper body actuators 23 from the determined target position/orientation, and a master upper body actuator displacement controller 46 for controlling the displacements of the respective master upper body actuators 23 based on the calculated target displacements.

The target master upper body position/orientation determining unit 44 determines a target position/orientation for the upper body of the operator based on tilted orientation information of the upper body of the robot R which is supplied from the robot control unit 11 through the communication unit 41, and a target foot position/orientation for the feet of the operator on the master unit M (a target position/orientation for the foot support bases 28, hereinafter referred to as a master target foot position/orientation) which is supplied from a leg bilateral main controller 47, described later on, of the master foot controller 43.

Based on the calculated target displacements from the target actuator displacement calculator 45 and displacements of the master upper body actuators 23 which are detected by the actuator displacement detectors 23x, the master upper body actuator displacement controller 46 controls the displacements of the master upper body actuators 23 so as to be equalized to the target displacements through a feedback control loop.

In this embodiment, the target master upper body position/orientation determined by the target master upper body position/orientation determining unit 44 is supplied to a master leg main controller 48, described later on, of the master foot controller 43.

The master foot controller 43 comprises a leg bilateral main controller 47 for determining the master target foot position/orientation and a target foot position/orientation for the robot R, a master leg main controller 48 for calculating target displacements (target angular displacements) for the respective master foot actuators 30 from the determined master target foot position/orientation and the target master upper body position/orientation determined by the target master upper body position/orientation determining unit 44, and a master foot actuator displacement controller 49 for controlling the displacements of the respective master foot actuators 30 so as to be equalized to the calculated target displacements.

The master target foot position/orientation determined by the leg bilateral main controller 47 is a relative master target foot position/orientation with respect to the upper body of the operator on the master unit M. Similarly, the target foot position/orientation for the robot R which is determined by the leg bilateral main controller 47 is a relative target foot position/orientation with respect to the upper body of the robot R. Specifically, according to this embodiment, as shown in FIG. 1, there is established an XYZ orthogonal coordinate system whose origin is located at the center of a hip joint of the robot R where the legs 3 and the torso 2 are interconnected, the XYZ orthogonal coordinate system having Z-, X-, and Y-axes which extend respectively as the vertical, sagittal, and lateral axes of the torso 2. The XYZ orthogonal coordinate system is fixed to the torso 2 such that the XYZ orthogonal coordinate system will be tilted with the torso 2 when the torso 2 is tilted. The target foot position/orientation for the robot R which is determined by the leg bilateral main controller 47 is a target foot position/orientation in this XYZ orthogonal coordinate system (hereinafter referred to as a robot upper body coordinate system). Likewise, as shown in FIG. 2, there is established an XYZ orthogonal coordinate system whose origin is located at the center of a hip joint of the operator, i.e., at the center of the saddle 21, the XYZ orthogonal coordinate system being fixed to the upper body support mechanism 14 such that the XYZ orthogonal coordinate system will be tilted with the upper body support mechanism 14 when the upper body support mechanism 14 is tilted. The master target foot position/orientation determined by the leg bilateral main controller 47 is a target foot position/orientation in this XYZ orthogonal coordinate system (hereinafter referred to as a master upper body coordinate system).

The master leg main controller 48 calculates target displacements for the respective master foot actuators 30, and also converts forces applied to the foot support bases 28 by the operator and detected by the six-axis force sensors 29 (the forces are detected in a coordinate system fixed with respect to the six-axis force sensors 29) into values in the master upper body coordinate system based on the target displacements for the respective master foot actuators 30 and the target master upper body position/ orientation, and supplies the converted values to the leg bilateral main controller 47.

Forces acting on the feet of the robot R, detected by the six-axis force sensors 6 on the legs 3 of the robot R, are converted into values in the robot upper body coordinate system by the robot control unit 11, and the converted values are supplied through the communication unit 41 to the leg bilateral main controller 47. The leg bilateral main controller 47 processes the detected values in the master upper body coordinate system from the master leg main controller 48 and the detected values in the robot upper body coordinate system from the robot control unit 11 to determine the master target foot position/orientation and the target foot position/orientation for the robot R. At this time, the master target foot position/orientation and the target foot position/orientation for the robot R in the upper body coordinate systems are determined so as to be associated with each other in a predetermined relationship.

The leg bilateral main controller 47 supplies the determined master target foot position/orientation to the master leg main controller 48 and the target master upper body position/orientation determining unit 44, and supplies the determined target foot position/orientation for the robot R through the communication unit 41 to the robot control unit 11.

The master foot actuator displacement controller 49 controls the displacements of the respective master foot actuators 30 so as to be equalized to the calculated target displacements through a feedback loop based on the target displacements supplied from the master leg main controller 48 and the displacements of the master foot actuators 30 which are detected by the actuator displacement detectors 30x combined with the respective master foot actuators 30.

The robot control unit 11 shown in FIG. 4 comprises, as means for controlling operation of the legs 3 of the robot R, a robot leg main controller 50 for determining target displacements (target angular displacements) for the respective leg actuators 5 from the target foot position/orientation for the robot R supplied from the leg bilateral main controller 47, and converting forces acting on the feet of the robot R, detected by the six-axis force sensors 6 on the legs 3, into values in the robot upper body coordinate system based on target displacements for the leg actuators 5 and supplying the converted values to the leg bilateral main controller 47, and a robot leg actuator displacement controller 51 for controlling the displacements of the leg actuators 5 so as to be equalized to the determined target displacements.

The robot leg actuator displacement controller 51 controls the displacements of the leg actuators 5 so as to be equalized to the determined target displacements through a feedback loop based on the target displacements supplied from the robot leg main controller 50 and the displacements of the leg actuators 5 which are detected by the actuator displacement detectors 13 combined with the respective leg actuators 5.

The master foot controller 43 of the master control unit 40, and the robot leg main controller 50 and the robot leg actuator displacement controller 51 of the robot control unit 11 jointly serve as foot position/orientation control means 52. The robot control unit 11 also has a controller for controlling operation of the arms 4 of the robot R. However, such a controller will not be described in detail below as it has no direct bearing on the present invention.

As shown in FIG. 4, the tilt detector 12 comprises an acceleration sensor 53a for detecting accelerations along the three axes of the upper body of the robot R, a rate gyro 53b for detecting angular velocities along the three axes of the upper body of the robot R, and a tilt estimator 54 for calculating and estimating a tilt angle of the upper body of the robot R from detected accelerations and angular velocities from the acceleration sensor 53a and the rate gyro 53b. The tilt detector 12 supplies the tilt angle of the upper body of the robot R which has been estimated by the tilt estimator 54 and the accelerations of the upper body of the robot R which have been detected by the acceleration sensor 53a, as orientation tilt information through the communication unit 41 to the target master upper body position/orientation determining unit 44.

Operation of the remote control system according to the first embodiment of the present invention will be described below.

First, control processes carried out by the master control unit 40 and the robot control unit 11 will be described below.

Figure 5:
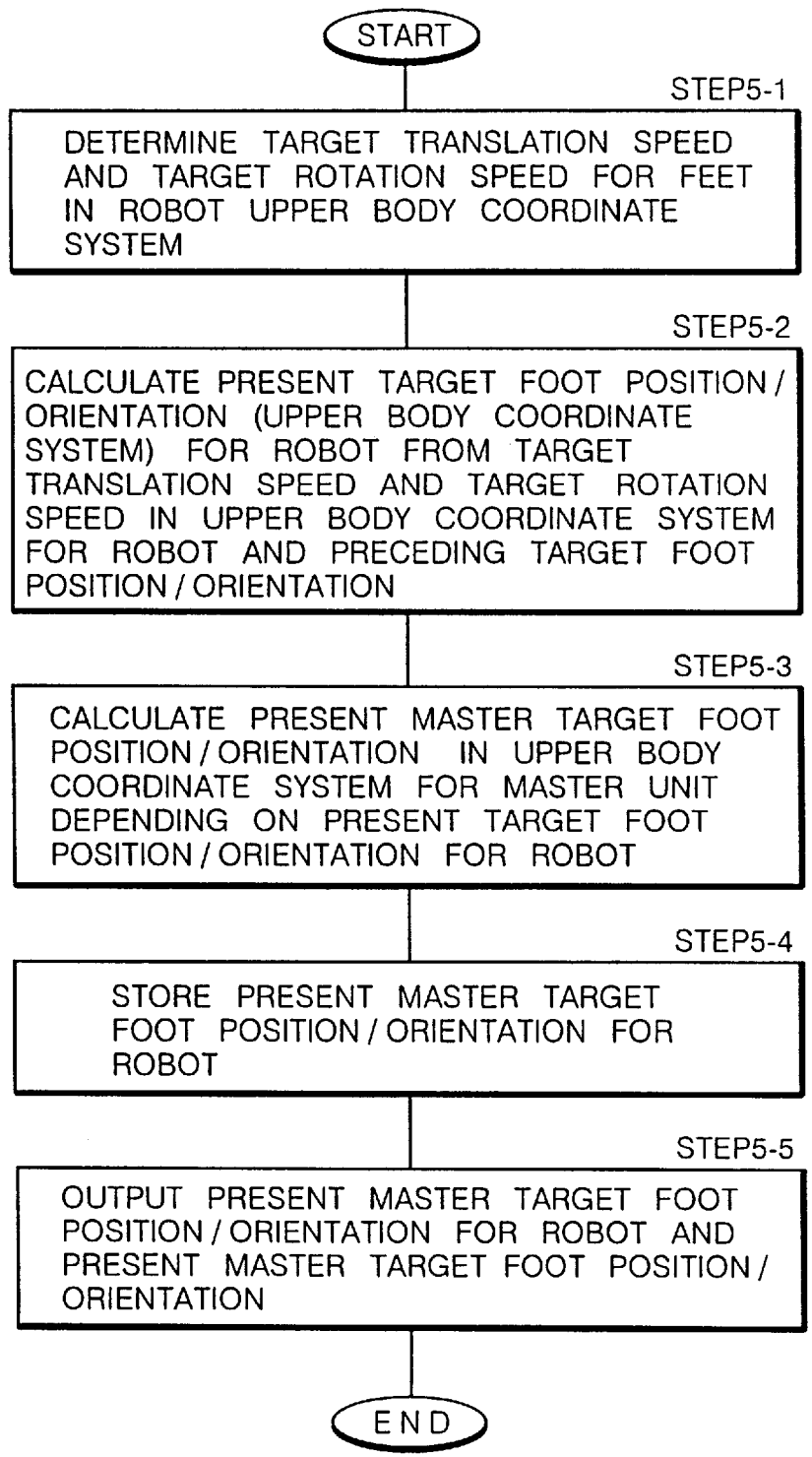
FIG. 5 is a flowchart of an operation sequence of the control system section shown in FIG. 3.

When the operator whose upper body is supported by the upper body support mechanism 14 of the master unit M and whose feet are supported by the foot support mechanism 15 of the master unit M starts manipulating the robot R, the leg bilateral main controller 47 of the master control unit 40 executes an operation sequence shown in FIG. 5 in a predetermined control cycle.

As shown in FIG. 5, the leg bilateral main controller 47 determines a target translation speed (a target speed of movement along the axes of the robot upper body coordinate system) and a target rotation speed (a target rotation speed about the axes of the robot upper body coordinate system) for the feet 7 of the robot R in the robot upper body coordinate system in STEP5-1.

The remote control system according to this embodiment controls the robot R to keep forces acting on the feet of the operator (hereinafter referred to as master foot acting forces) and forces acting on the feet of the robot R (hereinafter referred to as robot foot acting forces) in a predetermined relationship to each other, e.g., proportional to each other, while maintaining the feet of the operator on the master unit M and the feet 7 of the robot R in the same relative position/orientation with respect to the respective upper bodies. To this end, in STEP5-1, the leg bilateral main controller 47 determines the target translation speed and the target rotation speed for the feet 7 of the robot R in proportion to a deviation or difference between the present detected master foot acting forces in the master upper body coordinate system which are supplied from the master leg main controller 48 and the product of the present detected robot foot acting forces in the robot upper body coordinate system which are supplied from the robot leg main controller 50 through the communication unit 41 and a predetermined force gain (the deviation or difference=the detected master foot acting forces−the force gain×the detected robot foot acting forces). More specifically, the leg bilateral main controller 47 determines the target translation speed and the target rotation speed for the feet 7 of the robot R in proportion to the deviation in a manner to eliminate the deviation. The target translation speed is determined according to force components of the detected forces, and the target rotation speed is determined according to moment components of the detected forces.

If upward force components of the detected master foot acting forces, for example, are increased from a state in which the detected master foot acting forces=the force gain×the detected robot foot acting forces, i.e., the deviation is "0", then the target translation speed in the vertical direction for the feet 7 of the robot R is determined so as to increase upward force components of the detected robot foot acting forces. The magnitude of the target translation speed in the vertical direction is proportional to the magnitude of a vertical force component of the deviation, so that the magnitude of the target translation speed in the vertical direction is greater as the deviation is larger. This holds true for the target rotation speed.

The deviation corresponds to a deviation from the relationship (proportional relationship) between the master foot acting forces and the robot foot acting forces. The target translation speed and the target rotation speed may be determined such that the sum of one of the detected master foot acting forces and the detected robot foot acting forces and a predetermined offset will be proportional to the other of the detected master foot acting forces and the detected robot foot acting forces.

Then, the leg bilateral main controller 47 determines, in STEP5-2, a target foot position/orientation for the feet 7 of the robot R in the robot upper body coordinate system in the present control cycle from the target translation speed and the target rotation speed which have been determined in STEP5-1 and the targe foot position/orientation for the feet 7 of the robot R which have been determined in the robot upper body coordinate system in a preceding control cycle. Specifically, the leg bilateral main controller 47 determines a target change (including a direction of change) for the foot position/orientation of the feet 7 of the robot R from the target translation speed and the target rotation speed, and adds the determined target change to the target foot position/orientation for the robot R in the preceding control cycle, for thereby determining the present target foot position/orientation.

In STEP5-3, the leg bilateral main controller 47 determines a present master target foot position/orientation in the master upper body coordinate system depending on the target foot position/orientation for the feet 7 of the robot R which has been determined in STEP5-2. It is preferable in principle that the target foot position/orientation for the robot R and the master target foot position/orientation in each of the upper body coordinate systems be in accord with each other. However, the master target foot position/orientation may be offset relatively to the target foot position/orientation for the robot R, or the scales of the master target foot position/orientation and the target foot position/orientation for the robot R may appropriately be adjusted.

Then, the leg bilateral main controller 47 stores the target foot position/orientation for the robot R which has been determined in STEP5-2 in a memory (not shown) in STEP5-4. Thereafter, the leg bilateral main controller 47 outputs the target foot position/orientation for the robot R in the robot upper body coordinate system through the communication unit 41 to the robot control system 11, and also outputs the master target foot position/orientation in the master upper body coordinate system which has been determined in STEP5-3 to the master leg main controller 48 and the target master upper body position/orientation determining unit 44 in STEP5-5. The operation sequence executed by the leg bilateral main controller 47 in the present control cycle is now finished.

In the above operation sequence executed by the leg bilateral main controller 47, the target translation speed and the target rotation speed for the feet 7 of the robot R are determined from the deviation, the target foot position/orientation for the robot R is determined from the determined speeds, and the master target foot position/orientation is determined in association with the target foot position/orientation for the robot R. Conversely, however, the target translation speed and the target rotation speed for the feet of the operator on the master unit M may be determined from the deviation, the master target foot position/orientation may be determined from the determined speeds, and the target foot position/orientation for the robot R may be determined in association with the master target foot position/orientation. In such a variation, the target translation speed and the target rotation speed for the feet of the operator may be determined in proportion to the magnitude of the deviation in a manner to eliminate the deviation, as with the processing in STEP5-1. The master target foot position/orientation may be determined by determining a target change for the feet of the operator in the period of a control cycle from the target translation speed and the target rotation speed for the feet of the operator and adding the target change to the master target foot position/orientation in the preceding control cycle, as with the processing in STEP5-2. The target foot position/orientation for the robot R may be determined so as to match the previously determined master target foot position/orientation, as with the processing in STEP5-3.

Alternatively, the target translation speeds and the target rotation speeds for the feet 7 of the robot R and the feet of the operator may be determined from the deviation, and the target foot position/orientation for the robot R and the master target foot position/orientation may be determined separately from the determined speeds. In such a modification, the target translation speed and the target rotation speed for the feet of the operator and the target translation speed and the target rotation speed for the feet 7 of the robot R may be determined in proportion to the magnitude of the deviation in a manner to eliminate the deviation, as with the processing in STEP5-1. The master target foot position/orientation may be determined by determining a target change for the feet of the operator in the period of a control cycle from the target translation speed and the target rotation speed for the feet of the operator and adding the target change to the master target foot position/orientation in the preceding control cycle, as with the processing in STEP5-2. Similarly, the target foot position/orientation for the robot R may be determined by determining a target change for the feet 7 of the robot R in the period of a control cycle from the target translation speed and the target rotation speed for the feet of the operator and adding the target change to the target foot position/orientation for the robot R in the preceding control cycle. After the master target foot position/orientation and the target foot position/orientation for the robot R are separately determined, these target foot positions/orientations may be adjusted so as to match each other.

Figure 6:
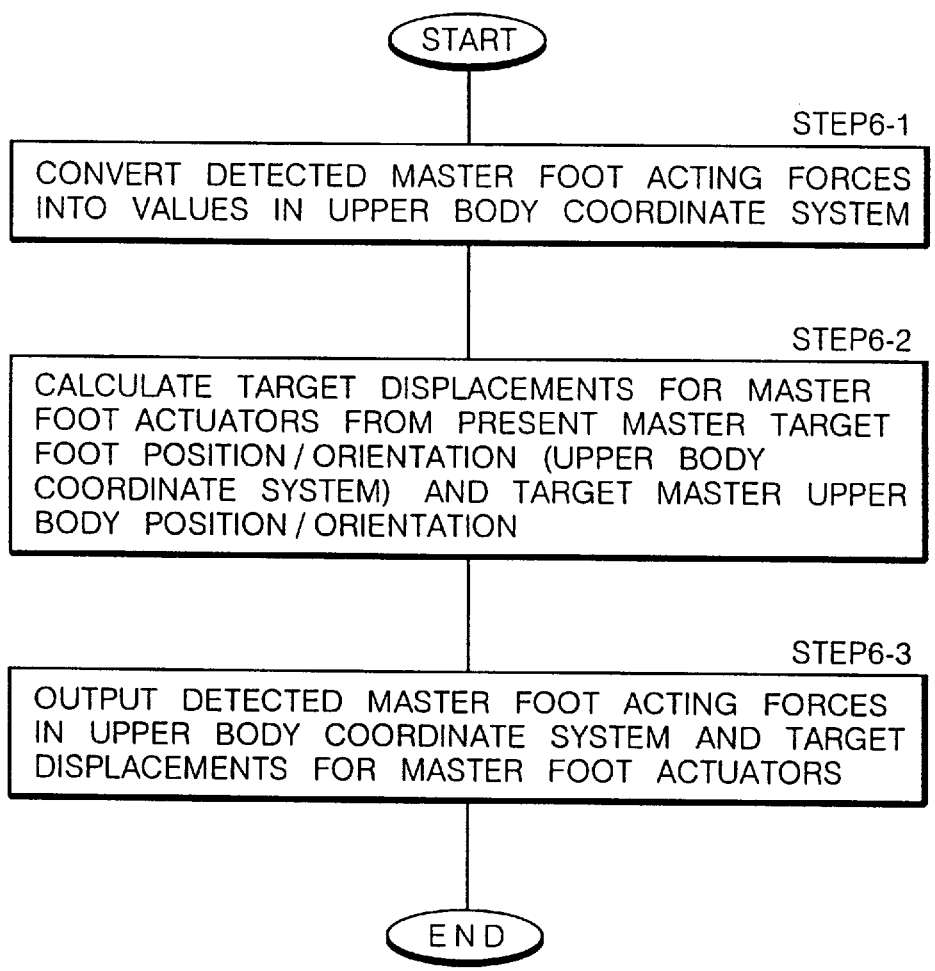
FIG. 6 is a flowchart of an operation sequence of the control system section shown in FIG. 3.
Figure 7:
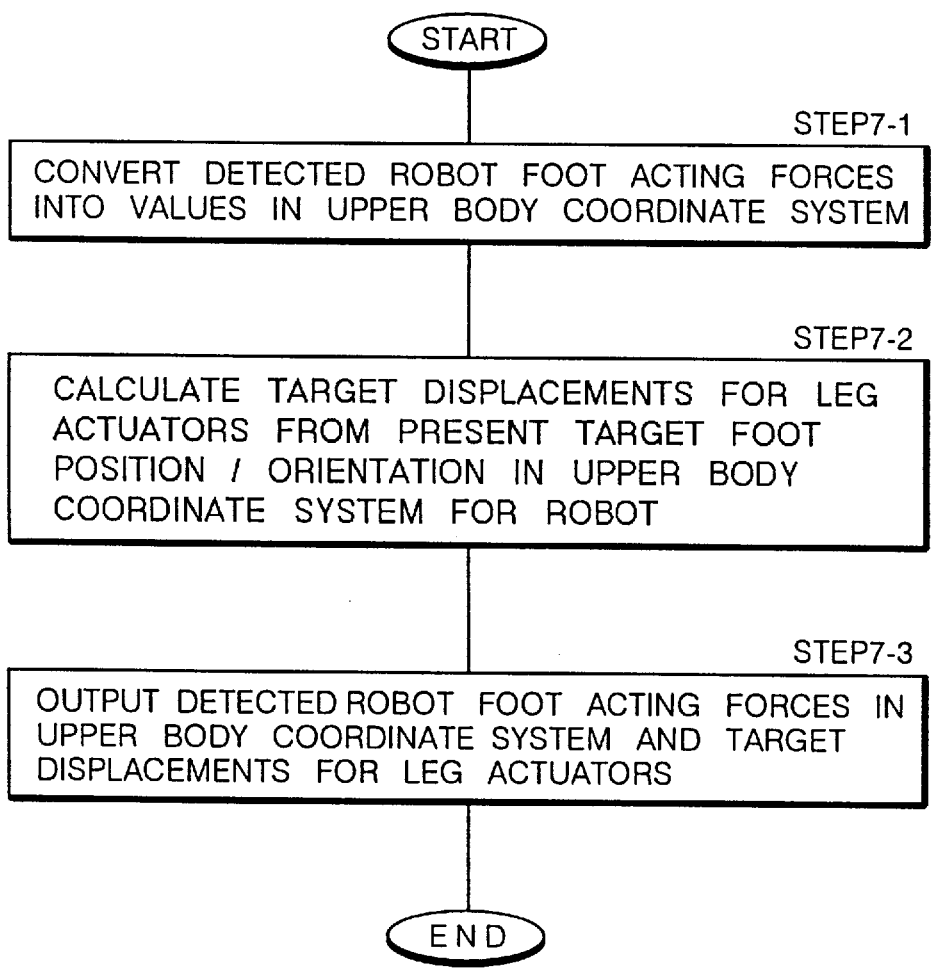
FIG. 7 is a flowchart of an operation sequence of the control system section shown in FIG. 4.

Concurrent with the above processing of the leg bilateral main controller 47, the master leg main controller 48 of the master control unit 40 and the robot leg main controller 50 of the robot control unit 11 execute respective operation sequences shown in FIGS. 6 and 7 in the above control cycle.

As shown in FIG. 6, the master leg main controller 48 converts the master foot acting forces detected by the six-axis force sensors 29 combined with the foot support bases 28 into values in the master upper body coordinate system in STEP6-1. Specifically, the master leg main controller 48 determines a position/orientation in the master upper body coordinate system of the six-axis force sensors 29 from the present master target foot position/orientation in the master upper body coordinate system which is given from the leg bilateral main controller 47, and, using the determined position/orientation, converts the master foot acting forces detected by the six-axis force sensors 29 (the forces are detected in a coordinate system fixed with respect to the six-axis force sensors 29) into values in the master upper body coordinate system. A position/orientation in the master upper body coordinate system of the six-axis force sensors 29 may be determined by using the displacements of the respective master foot actuators 30 which are detected by the actuator displacement detectors 30x and the displacements of the master upper body actuators 23 which are detected by the actuator displacement detectors 23x or a target master upper body position/orientation which will be determined by the target master upper body position/orientation determining unit 44, as described later on.

Then, the master leg main controller 48 calculates target displacements for the respective master foot actuators 30 from the present master target foot position/orientation in the master upper body coordinate system which is supplied from the leg bilateral main controller 47 and a target master upper body position/orientation which will be determined by the target master upper body position/orientation determining unit 44, as described later on, in STEP6-2. Specifically, in order to cause the foot position/orientation on the master unit M to follow a change in the upper body position/orientation, a change in the target master upper body position/orientation from the preceding control cycle is added to the present master target foot position/orientation in the master upper body coordinate system for thereby calculating target displacements for the respective master foot actuators 30. The displacements of the respective master upper body actuators 23 detected by the actuator displacement detectors 23x may be used instead of the target master upper body position/orientation.

The master leg main controller 48 outputs the detected master foot acting forces in the master upper body coordinate system which are determined in STEP6-1 to the leg bilateral main controller 47, and also outputs the target displacements for the respective master foot actuators 30 which are determined in STEP6-2 to the master foot actuator displacement controller 49 in STEP6-3. The operation sequence executed by the master leg main controller 48 is now finished.

When supplied with the target displacements for the respective master foot actuators 30 from the master leg main controller 48, the master foot actuator displacement controller 49 controls the displacements of the respective master foot actuators 30 so as to be equalized to the target displacements through a feedback loop.

As shown in FIG. 7, the robot leg main controller 50 converts the robot foot acting forces detected by the six-axis force sensors 6 combined with the legs 3 into values in the robot upper body coordinate system in the same process as used by the master leg main controller 48 in STEP7-1.

Then, the robot leg main controller 50 calculates target displacements for the respective leg actuators 5 from the present target foot position/orientation for the robot R in the robot upper body coordinate system which has been supplied from the leg bilateral main controller 47 through the communication unit 41 in STEP7-2. Since the legs 3 of the robot R are coupled to the upper body (the torso 2) thereof, the target displacements for the respective leg actuators 5 can be determined only from the present target foot position/orientation for the robot R.

The robot leg main controller 50 outputs the detected robot foot acting forces in the robot upper body coordinate system which have been determined in STEP7-1 to the leg bilateral main controller 47, and also outputs the target displacements for the respective leg actuators 5 which have been calculated in STEP7-2 to the robot leg actuator displacement controller 51 in STEP7-3. The operation sequence executed by the robot leg main controller 50 is now finished.

When supplied with the target displacements for the respective leg actuators 5 from the robot leg main controller 50, the robot leg actuator displacement controller 51 controls the displacements of the respective leg actuators 5 so as to be equalized to the target displacements through a feedback loop.

The processing in STEP6-1 and the processing in STEP6-2 which are carried out by the master leg main controller 48 may be switched around, and the processing in STEP7-1 and the processing in STEP7-2 which are carried out by the robot leg main controller 50 may also be switched around.

Figure 8:
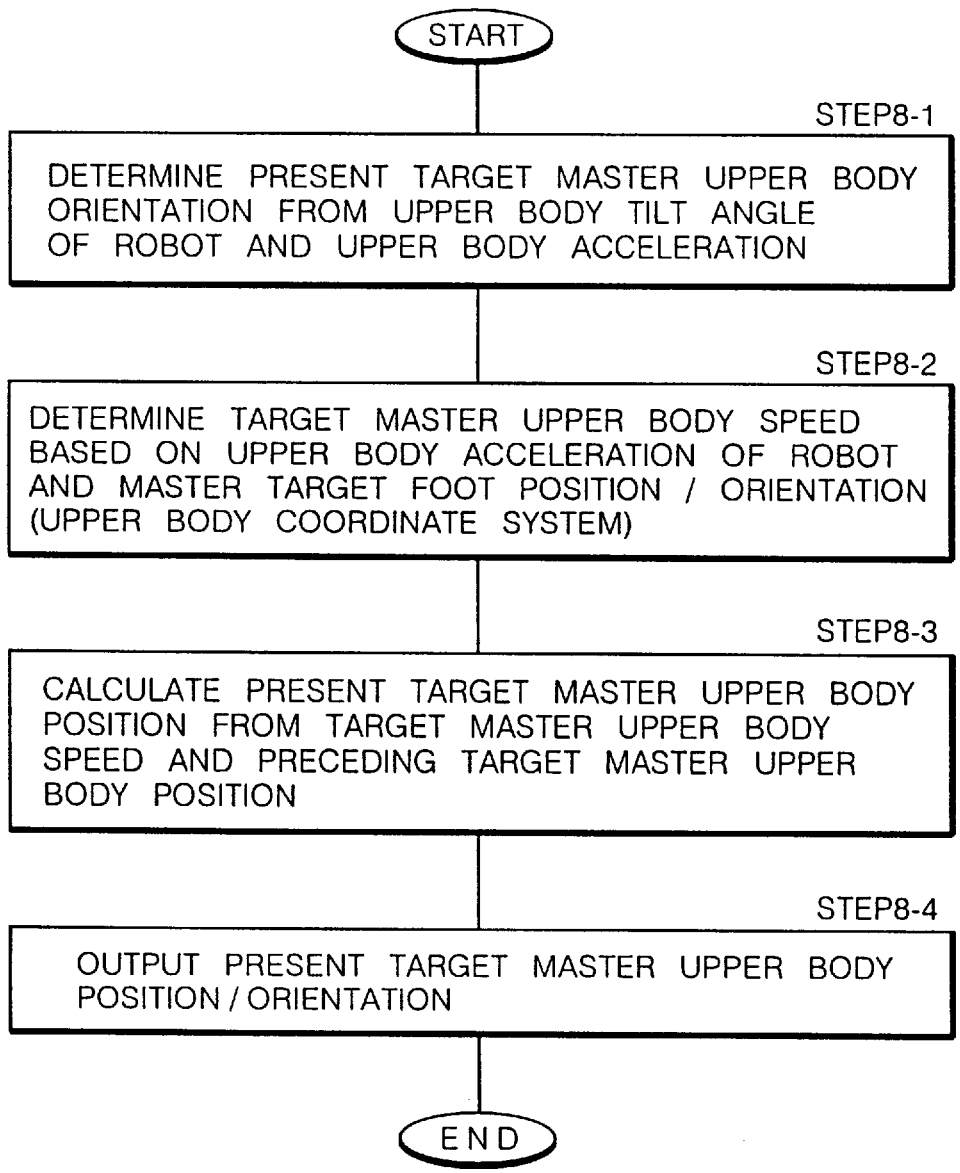
FIG. 8 is a flowchart of an operation sequence of the control system section shown in FIG. 3.

The target master upper body position/orientation determining unit 44 of the master upper body controller 42 executes an operation sequence shown in FIG. 8 in the above control cycle.

As shown in FIG. 8, the target master upper body position/orientation determining unit 44 determines a target master upper body orientation (target tilt angles along the sagittal and lateral axes for the back holder 19 (the torso of the operator) of the master unit M) from the upper body tilt angle (tilt angles along the sagittal and lateral axes) of the robot R which is supplied from the tilt detector 12 of the robot R through the communication unit 41 in STEP8-1. Specifically, the target master upper body position/orientation determining unit 44 determines a target master upper body orientation by multiplying the upper body tilt angle of the robot R by a predetermined gain depending on the operator. Basically, the target master upper body orientation should preferably be determined in proportion to the upper body tilt angle of the robot R. However, the target master upper body orientation may be determined by adding a predetermined offset (the tilt angle of the back holder 19 at the time the upper body tilt angle of the robot R is "0") to the upper body tilt angle of the robot R. Furthermore, the target master upper body orientation may also be determined by adding a value depending on the upper body acceleration of the robot R which is given from the tilt detector 12 of the robot R.

Then, the target master upper body position/orientation determining unit 44 determines a target master upper body speed (a speed of the back holder 19 of the master unit M) based on the upper body acceleration of the robot R which is given from the tilt detector 12 and the master target foot position/orientation in the master upper body coordinate system which is given from the leg bilateral main controller 47 in STEP8-2. Specifically, the target master upper body speed is calculated according to the following equation (1):

Target master upper body speed=Δt·[K·robot upper body acceleration−Kf·(preceding target master upper body position−master upper body convergent target position)]+preceding target master upper body position (1)

where Δt represents the period of the control cycle, K represents a predetermined gain which prescribes the acceleration of the back holder 19 (the upper body acceleration of the operator) depending on the upper body acceleration of the robot R, and the "master upper body converged target position" is a converged target position for the upper body of the operator (the back holder 19) determined in order to prescribe a movement limit for the back holder 19 in view of the foot position/orientation at the master unit M for preventing the back holder 19 from exceeding the movable range of the master upper body actuators 23 under inertial forces. The master upper body converged target position is determined depending on the master target foot position/orientation given from the leg bilateral main controller 47. The second term including the master upper body converged target position in the brackets of the equation (1) defines recovery forces for returning the back holder 19 to the master upper body converged target position, and "Kf" contained in the second term in the brackets of the equation (1) represents a predetermined gain which defines the magnitude of the recovery forces.

According to the equation (1), the target master upper body speed can be determined in the present control cycle in order to allow the speed of the back holder 19 to vary depending on the upper body acceleration of the robot R without exceeding the movable range of the master upper body actuators 23.

Then, the target master upper body position/orientation determining unit 44 determines a present target master upper body position from the target master upper body speed thus determined and the target master upper body position in the preceding control cycle in STEP8-3. Specifically, a change in the position (including a direction of change) of the back holder 19 in the period of the control cycle is determined from the target master upper body speed, and added to the preceding target master upper body position, thereby determining the present target master upper body position.

The target master upper body position/orientation determining unit 44 thereafter outputs the target master upper body orientation determined in STEP8-1 and the target master upper body position determined in STEP8-3 to the target actuator displacement calculator 45 and the master leg main controller 48 in STEP8-4. The operation sequence executed by the target master upper body position/orientation determining unit 44 now comes to an end.

The processing in STEP8-1 and the processing in STEP8-2, STEP8-3 may be switched around.

The target actuator displacement calculator 45 calculates target displacements for the master upper body actuators 23 from the supplied target master upper body position/orientation, and supplies the calculated target displacements to the master upper body actuator displacement controller 46. The master upper body actuator displacement controller 46 controls the displacements of the master upper body actuators 23 so as to be equalized to the target displacements through a feedback loop, as described above.

In the remote control system according to the present embodiment, the arms 4 of the robot R are controlled on the bilateral master-slave principles such that forces acting on the wrists of the robot R and the operator will be associated with each other, as is the case with the legs 3 of the robot R, when the operator operates the master arm mechanism 32. The arms 4 of the robot R may be controlled on the symmetrical bilateral master-slave principles, or with a remote control unit having a joystick or the like.

According to the above control process, in an upstanding still state of the robot R (at this time, the feet of the operator placed on the foot support bases 28 are in a position/orientation corresponding to the position/orientation of the feet 7 of the robot R), when the detected master foot acting forces and the detected robot foot acting forces are associated with each other in a predetermined relationship (proportional to each other in this embodiment), the target translation speed and the target rotation speed for the feet 7 of the robot R which are determined by the leg bilateral main controller 47 in STEP5-1 are "0". Therefore, the target foot position/orientation for the robot R and the master target foot position/orientation are maintained as they are. Based on the target foot position/orientation for the robot R, the robot leg main controller 50 and the robot leg actuator displacement controller 51 execute the above operation sequence thereof, and based on the master target foot position/orientation, the robot leg main controller 50 and the robot leg actuator displacement controller 51 execute the above operation sequence thereof, for thereby keeping the master foot acting forces the robot foot acting forces associated with each other in the predetermined relationship.

For controlling the robot R to walk from the upstanding still state, the operator moves its own feet fastened to the respective foot support bases 28 in a gait which the operator wants the robot R to have. Specifically, the operator lifts the foot with which to step on the floor, and then lowers the foot at a position/orientation in which to land on the floor. The operator repeats this action alternately for the legs.

When the operator lifts the foot with which to step on the floor for causing the robot R to walk, the detected master foot acting forces applied from the foot support base 28 to the foot of the operator in the direction in which the foot moves change out of association with the foot acting forces of the robot R. Therefore, the leg bilateral main controller 47 determines the target translation speed and the target rotation speed for the feet 7 of the robot R as described above to cause the feet 7 of the robot R to follow the motion of the feet of the operator. At the target translation speed and the target rotation speed, the target foot position/orientation for the robot R is changed, and the master target foot position/orientation is determined in association therewith, so that the foot of the operator with which to step on the floor and the foot 7 of the robot R with which to step on the floor move in the same pattern as each other.

When the foot 7 of the robot R is landed on the floor, the detected robot foot acting forces imposed on the foot 7 from the floor abruptly increase compared with the detected master foot acting forces imposed on the foot of the operator from the foot support base 28. The target translation speed and the target rotation speed for the robot R are determined in a manner to suppress a change in the target foot position/orientation for the robot R, and the master target foot position/orientation is also determined in a manner to suppress a change therein. Therefore, the movement of the foot support base 28 on which the foot of the operator is placed is suppressed, and the master foot acting forces are increased so as to match the robot foot acting forces. The operator now recognizes a landing sensation caused by the landing of the foot of the robot R.

The foot 7 of the robot R and the foot of the operator receive the same acting forces as each other, and move in the same fashion as each other.

When the upper body of the robot R is tilted under external forces while the robot R is walking, the master upper body controller 42 executes the above operation sequence to tilt the back holder 19 to which the torso of the operator is fastened in the same manner as the upper body of the robot R. At this time, the detected robot foot acting forces imposed on the foot 7 of the robot R on the side toward which the upper body of the robot R is tilted are increased. Consequently, the master target foot position/orientation is determined to increase the master foot acting forces on the side toward which the upper body of the operator is tilted.

Therefore, the operator recognizes the instability of the robot R based on the change in the master foot acting forces which the operator's foot receives and the tilting of the upper body of the operator depending on the tilting of the upper body of the robot R, and braces the leg in order to apply a load to the foot on the side toward which the operator's upper body is tilted. When the operator braces the leg, the robot R operates to brace the leg 3 on the side toward which the upper body of the robot R is tilted, making the robot R stable.

In the remote control system according to this embodiment, as described above, the master target foot position/orientation and the target foot position/orientation for the robot R are determined such that the master foot acting forces applied to the operator on the master unit M and the robot foot acting forces applied to the robot R will be associated with each other in a predetermined relationship. The operator can accurately recognize how the robot R is stable or unstable based on the foot acting forces applied to the operator, and can manipulate the robot R so keep the robot R stable.

The master foot acting forces and the robot foot acting forces are detected, and the above operation sequences are carried out for thereby making the master foot actuators 30 and the leg actuators 5 free from being influenced by inertial and frictional forces. The operator can reliably recognize the robot foot acting forces applied to the robot R through the master foot acting forces which correspond to the robot foot acting forces.

When the upper body of the robot R is tilted under external forces, the upper body of the operator is also tilted accordingly. The operator can appropriately manipulate the robot R in unison therewith while accurately recognizing the stability and instability of the robot R.

While the foot position/orientation of the operator and the foot position/orientation of the robot R are being associated with each other in a predetermined relationship with the upper body of the operator being supported by the upper body support mechanism 14 of the master unit M, the relative master target foot position/orientation with respect to the upper body of the operator and the relative target foot position/orientation with respect to the upper body of the robot R are determined in order to associate the master foot acting forces and the robot foot acting forces with each other in a predetermined relationship. Consequently, the operator can manipulate the robot R in a variety of floor configurations. For example, if the robot R is to be controlled to walk up a stair, then the operator may move the feet supported on the foot support bases 28 to walk as if going up a descending escalator at the same speed as the speed at which the descending escalator is moving.

Figure 9:
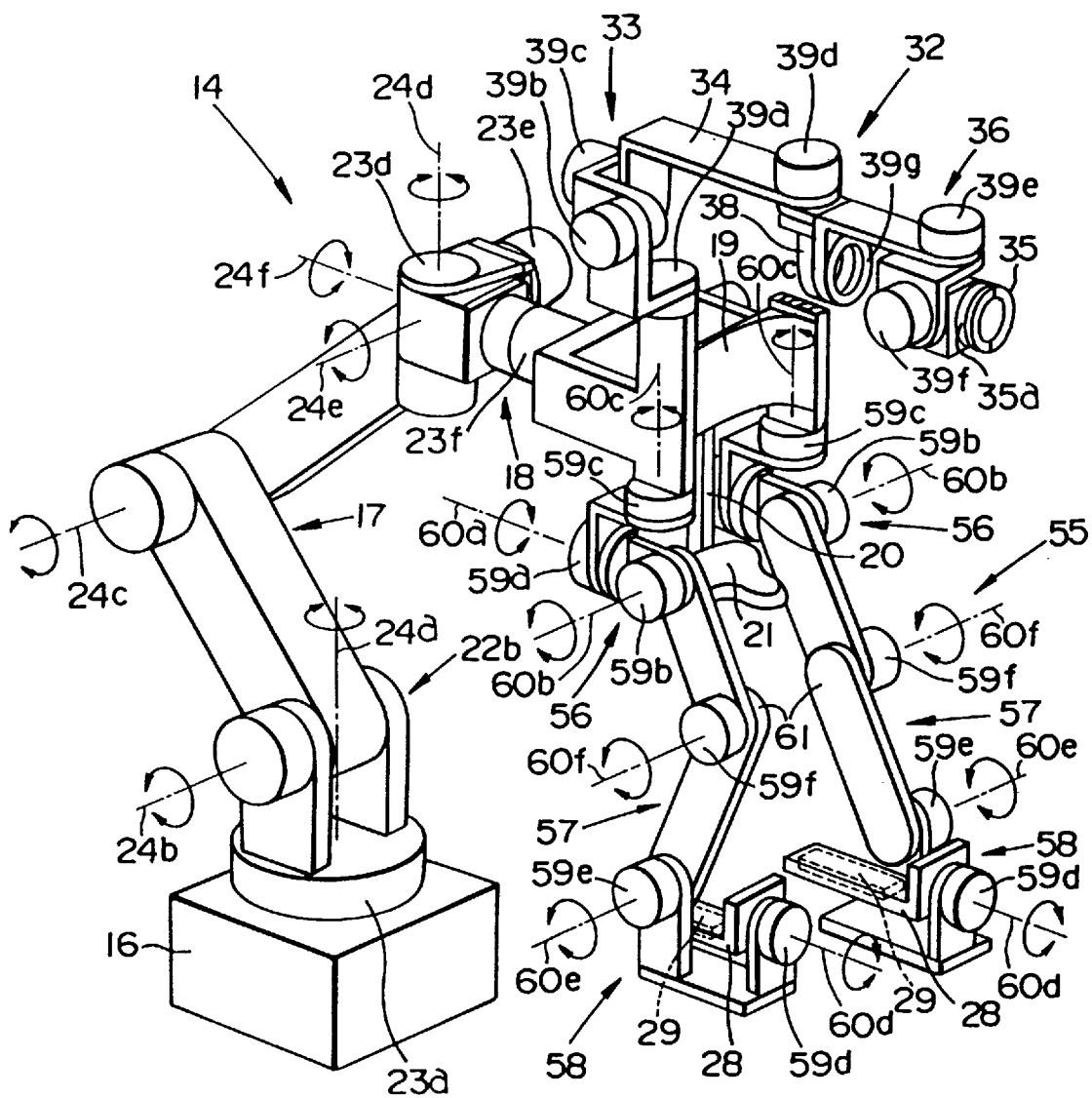
FIG. 9 is a perspective view of a master unit of a remote control system according to a second embodiment of the present invention.

A remote control system for a legged moving robot according to a second embodiment will be described below with reference to FIGS. 9 and 10 and also FIGS. 1, 3, and 4. Those parts of the remote control system according to the second embodiment which are identical in structure or function to those of the remote control system according to the first embodiment are denoted by identical reference characters, and will not be described in detail below.

The remote control system according to the second embodiment includes a robot R which is identical to the robot R according to the first embodiment (see.FIG. 1) and a master unit M having an upper body support mechanism 14 and a master arm mechanism 32 which are identical to those of the first embodiment and a foot support mechanism 55 which is different from the foot support mechanism 15 according to the first embodiment.

The foot support mechanism 55 comprises a pair of master leg mechanisms 57 in the form of link mechanisms extending downwardly from the respective opposite sides of the lower end of the back holder 16 through respective three-axis rotary mechanisms 56. Foot support bases 28 combined with respective six-axis force sensors 28, which are identical to those of the first embodiment, are attached to the respective lower ends of the master leg mechanisms 57 through respective two-axis rotary mechanisms 58.

Each of the three-axis rotary mechanisms 56 corresponds to the hip joint actuator 5a (see FIG. 1) at the hip joint, and has three actuators 59a, 59b, 59c for rotating the hip joint respectively about sagittal, lateral, and vertical axes 60a, 60b, 60c. Each of the two-axis rotary mechanisms 58 corresponds to the ankle joint actuator 5c (see FIG. 1) at the ankle joint, and has two actuators 59d, 59e for rotating the ankle joint respectively about sagittal and lateral axes 60d, 60e.

Each of the master leg mechanisms 57 has a joint disposed on an intermediate portion 61 thereof, and the intermediate portion 61 supports an actuator 59f, corresponding to the knee joint actuator 5b (see FIG. 1), for rotating the intermediate portion 61 about a lateral axis 60f.

With the master leg mechanisms 57, the foot support bases 28 at the lower ends thereof can be moved with six degrees of freedom by the actuators 59a~59f, as with the feet 7 of the robot R. The actuators 59a~59f will hereinafter be referred to as the master foot actuators 30 as with the first embodiment.

When the operator is to manipulate the robot R, the operator is seated on the saddle 21 with the upper body thereof held against the back holder 19 and with the feet placed on the foot support bases 28. The upper body and the feet of the operator are fastened respectively to the back holder 19 and the foot support bases 28 by belts (not shown).

In the second embodiment, control system sections for the master unit M and the robot R are basically the same as those control system sections (see FIGS. 3 and 4) described above with respect to the first embodiment. However, the control system sections according to the second embodiment differ to the control system sections according to the first embodiment in that data of the target master upper body position/orientation is not supplied from the target master upper body position/orientation determining unit 44 to the master leg main controller 48. Other details of the control system sections according to the second embodiment are the same as details of the control system sections according to the first embodiment.

Operation of the remote control system according to the second embodiment will be described below.

According to the second embodiment, only the operation sequence of the master leg main controller 48 (see FIG. 3) differs partly from the operation sequence of the master leg main controller 48 according to the first embodiment. The master leg main controller 48 according to the second embodiment executes an operation sequence shown in FIG. 10 in a predetermined control cycle.

Figure 10:
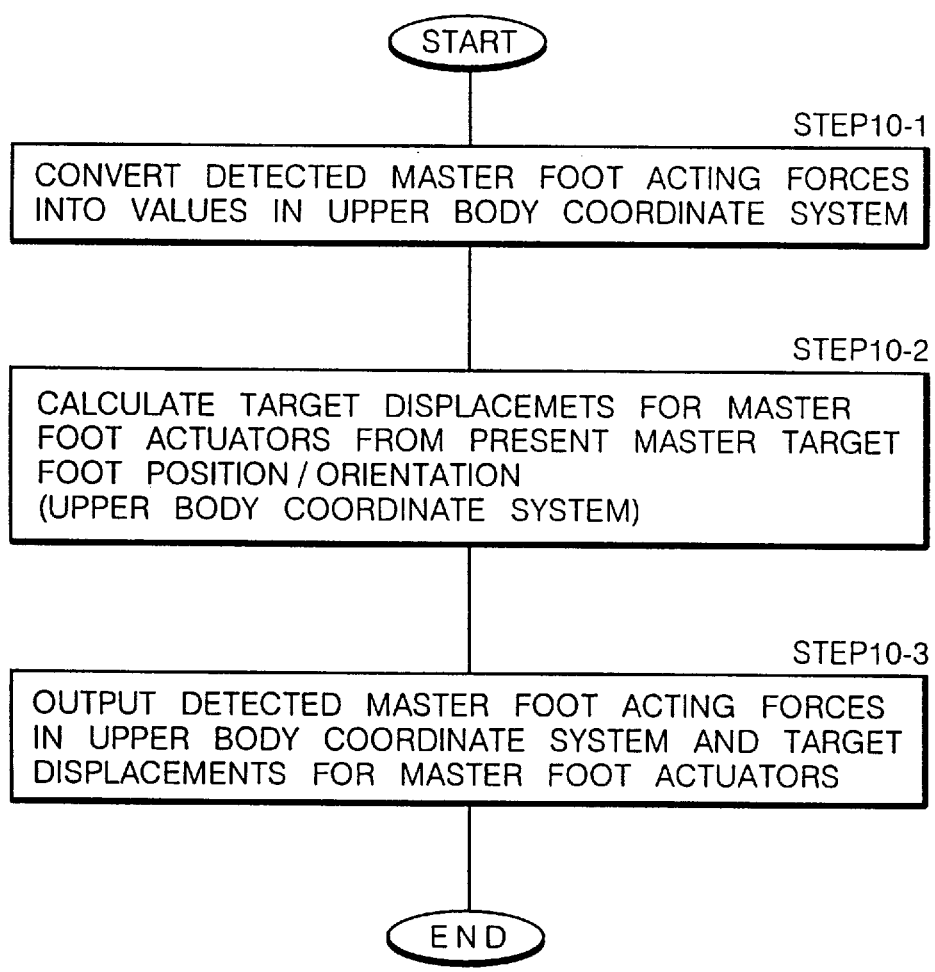
FIG. 10 is a flowchart of an operation sequence of a control system section for the master unit shown in FIG. 9.

As shown in FIG. 10, the master leg main controller 48 converts the master foot acting forces detected by the six-axis force sensors 29 combined with the foot support bases 28 into values in the master upper body coordinate system in STEP10-1. Thereafter, the master leg main controller 48 calculates target displacements for the master foot actuators 30 from the present master target foot position/orientation in the master upper body coordinate system which is supplied from the leg bilateral main controller 47 in STEP10-2. In calculating target displacements for the master foot actuators 30, the master leg main controller 48 does not use the target master upper body position/orientation unlike the first embodiment. According to the second embodiment, since the foot support mechanism 55 is coupled to the back holder 19 of the upper body support mechanism 14, the foot support mechanism 55 moves as so to follow the position/orientation of the back holder 19. Consequently, target displacements for the master foot actuators 30 are determined only by the master target foot position/orientation, and hence can be calculated only from the master target foot position/orientation.

Thereafter, the master leg main controller 48 outputs the detected master foot acting forces in the master upper body coordinate system to the leg bilateral main controller 47, and also outputs the target displacements for the respective master foot actuators 30 to the master foot actuator displacement controller 49 in STEP10-3. The operation sequence executed by the master leg main controller 48 is now finished.

Other details of the control process according to the second embodiment are the same as those of the control process according to the first embodiment (see FIGS. 5, 7, and 8).

When the remote control system according to the second embodiment operates in this manner, the master target foot position/orientation and the target foot position/orientation for the robot R are determined in order to associate the master foot acting forces applied to the operator and the robot foot acting forces applied to the robot R with each other in a predetermined relationship while keeping the foot position/orientation of the operator and the foot position/orientation of the robot R associated in a predetermined relationship. The operator can manipulate the robot R to maintain the robot R stable while accurately recognizing the stability or instability of the robot R with the foot acting forces imposed on the operator.

The master foot acting forces and the robot foot acting forces are detected, and the above operation sequences are carried out for thereby making the master foot actuators 30 and the leg actuators 5 free from being influenced by inertial and frictional forces. The operator can reliably recognize the robot foot acting forces applied to the robot R through the master foot acting forces which correspond to the robot foot acting forces.

When the upper body of the robot R is tilted under external forces, the upper body of the operator is also tilted accordingly. The operator can appropriately manipulate the robot R in unison therewith while accurately recognizing the stability and instability of the robot R.

The relative master target foot position/orientation with respect to the upper body of the operator and the relative target foot position/orientation with respect to the upper body of the robot R are determined in order to associate the master foot acting forces and the robot foot acting forces with each other in a predetermined relationship while the upper body of the operator is being supported by the upper body support mechanism 14 of the master unit M. Therefore, the operator can manipulate the robot R in a variety of floor configurations.

A remote control system for a legged moving robot according to a third embodiment of the present invention will be described below with reference to FIG. 11. Those parts of the remote control system according to the third embodiment which are identical in structure or function to those of the remote control systems according to the first and second embodiments are denoted by identical reference characters.

According to the third embodiment, the remote control system controls the foot position/orientation of the robot R and the foot position/orientation of the master unit M so as to associate the robot foot acting forces and the master foot acting forces with each other in a predetermined relationship if the feet 7 are movable with seven or more degrees of freedom in the case where each of the ankles of the robot R (see FIG. 1) is angularly movable about not only the sagittal and lateral axes, but also the vertical axis in the first and second embodiments (in this case, movements of the actuators associated with the legs cannot be determined uniquely only by the target foot position/orientation of the robot R).

Figure 11:
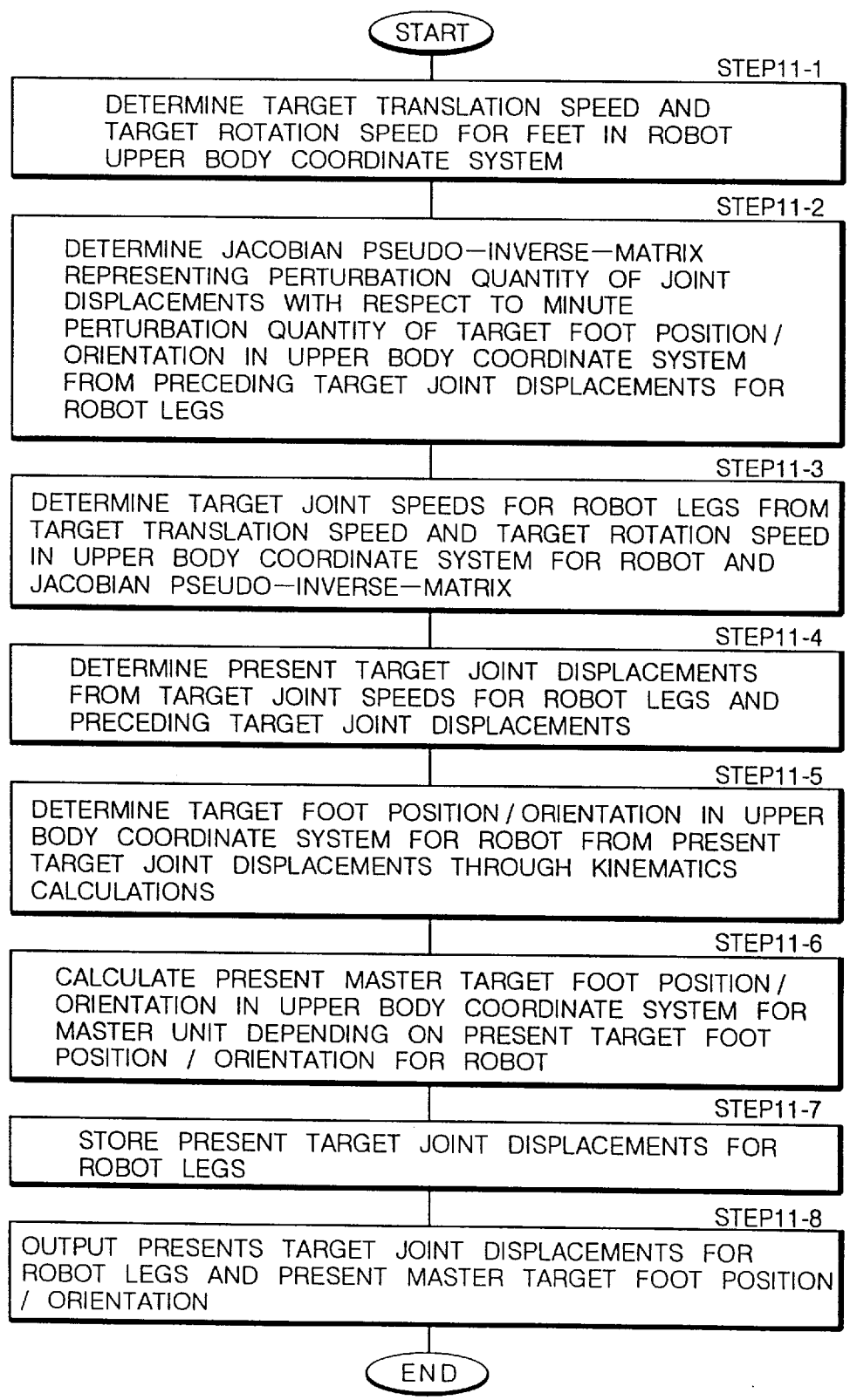
FIG. 11 is a flowchart of an operation sequence of a control system section for a master unit a remote control system according to a third embodiment of the present invention.

In the third embodiment, the leg bilateral main controller 47 executes an operation sequence shown in FIG. 11.

As shown in FIG. 11, the leg bilateral main controller 47 determines a target translation speed and a target rotation speed for the feet 7 of the robot R in the robot upper body coordinate system from the detected master foot acting forces in the master upper body coordinate system and the detected robot foot acting forces in the robot upper body coordinate system in STEP11-1, as with the first and second embodiments.

Then, the leg bilateral main controller 47 determines a so-called Jacobian pseudo-inverse-matrix which represents a perturbation quantity of joint displacements of the legs 3 with respect to a minute perturbation quantity (a minute change in the foot position/orientation) of the target foot position/orientation (positional components (coordinates) along the three axes and angular displacements about the three axes of the feet 7) in the upper body coordinate system for the robot R from preceding target joint displacements (target angular displacements for the actuators associated with the respective joints) of the legs 3 of the robot R in STEP11-2. The Jacobian pseudo-inverse-matrix is a matrix of three rows and six columns if the feet 7 are movable with seven degrees of freedom.

Then, in STEP11-3, the leg bilateral main controller 47 calculates present target joint speeds (target speeds for the actuators associated with the respective joints) for the legs 3 of the robot R from the target translation speed and the target rotation speed which have been determined in STEP11-1 and the Jacobian pseudo-inverse-matrix which has been determined in STEP11-2. Specifically, the leg bilateral main controller 47 calculates present target joint speeds by multiplying vectors having, as their elements, components along the three axes of the target. translation speed and components about the three axes of the target rotation speed, by the Jacobian pseudo-inverse-matrix.

The leg bilateral main controller 47 determines present target joint displacements from the present target joint speeds for the legs 3 of the robot R which have been calculated in STEP11-3 and the preceding target joint displacements in STEP11-4. Specifically, the leg bilateral main controller 47 adds values which are produced by multiplying the present target joint speeds by the period of the control cycle, to the preceding target joint displacements, thereby determining present target joint displacements.

Then, the leg bilateral main controller 47 determines a target foot position/orientation for the feet 7 of the robot R in the robot upper body coordinate system from the target joint displacements for the legs 3 of the robot R which have been determined in STEP11-4, through so-called kinematics calculations in STEP11-5. The leg bilateral main controller 47 determines a present master target foot position/orientation in the master upper body coordinate system depending on the target foot position/orientation for the feet 7 of the robot R in STEP11-6, as with the first and second embodiments.

Then, the leg bilateral main controller 47 stores the target joint displacements for the legs 3 of the robot R which have been determined in STEP11-4 in a memory (not shown) in STEP11-7. Thereafter, the leg bilateral main controller 47 outputs the present target joint displacements for the legs 3 which have been determined in STEP11-4 to the robot control unit 11, and also outputs the master target foot position/orientation in the master upper body coordinate system which has been determined in STEP11-6 to the master leg main controller 48 and the target master upper body position/orientation determining unit 44 in STEP11-8. The operation sequence executed by the leg bilateral main controller 47 in the present control cycle is now finished.

The robot control unit 11 controls the actuators associated with the joints of the legs 3 according to the given target joint displacements.

In this manner, the target joint displacements for the legs 3 of the robot R are determined, and the master target foot position/orientation in the master upper body coordinate system is determined. The legs 3 of the robot R and the master unit M are operated according to the target joint displacements and the master target foot position/orientation which have thus been determined. In this manner, even if the legs 3 of the robot R are movable with seven or more degrees of freedom, the master foot acting forces and the robot foot acting forces are associated with each other in a predetermined relationship while keeping the foot position/orientation of the operator and the foot position/orientation of the robot R associated in a predetermined relationship.

A remote control system for a legged moving robot according to a fourth embodiment of the present invention will be described below with reference to FIG. 12. Those parts of the remote control system according to the fourth embodiment which are identical in structure or function to those of the remote control systems according to the first and second embodiments are denoted by identical reference characters.

In each of the above embodiments, when the foot acting forces of the robot R change, the change is transmitted through the communication unit 41 to the master control unit 40, which changes the target foot position/orientation for the robot R. The changed target foot position/orientation for the robot R is transmitted through the communication unit 41 to the robot control unit 11, which controls the foot position/orientation of the robot R. Therefore, when the robot R is walking, a response delay tends to occur from the landing of each of the feet 7 on the floor until the foot 7 is stably supported on the floor due to the time lag caused by the transmission of the above information.

According to the fourth embodiment, the robot control unit 11 effects a so-called compliance control process for controlling the robot R to associate its foot acting forces autonomously with the master foot acting forces in a predetermined relationship.

Figure 12:
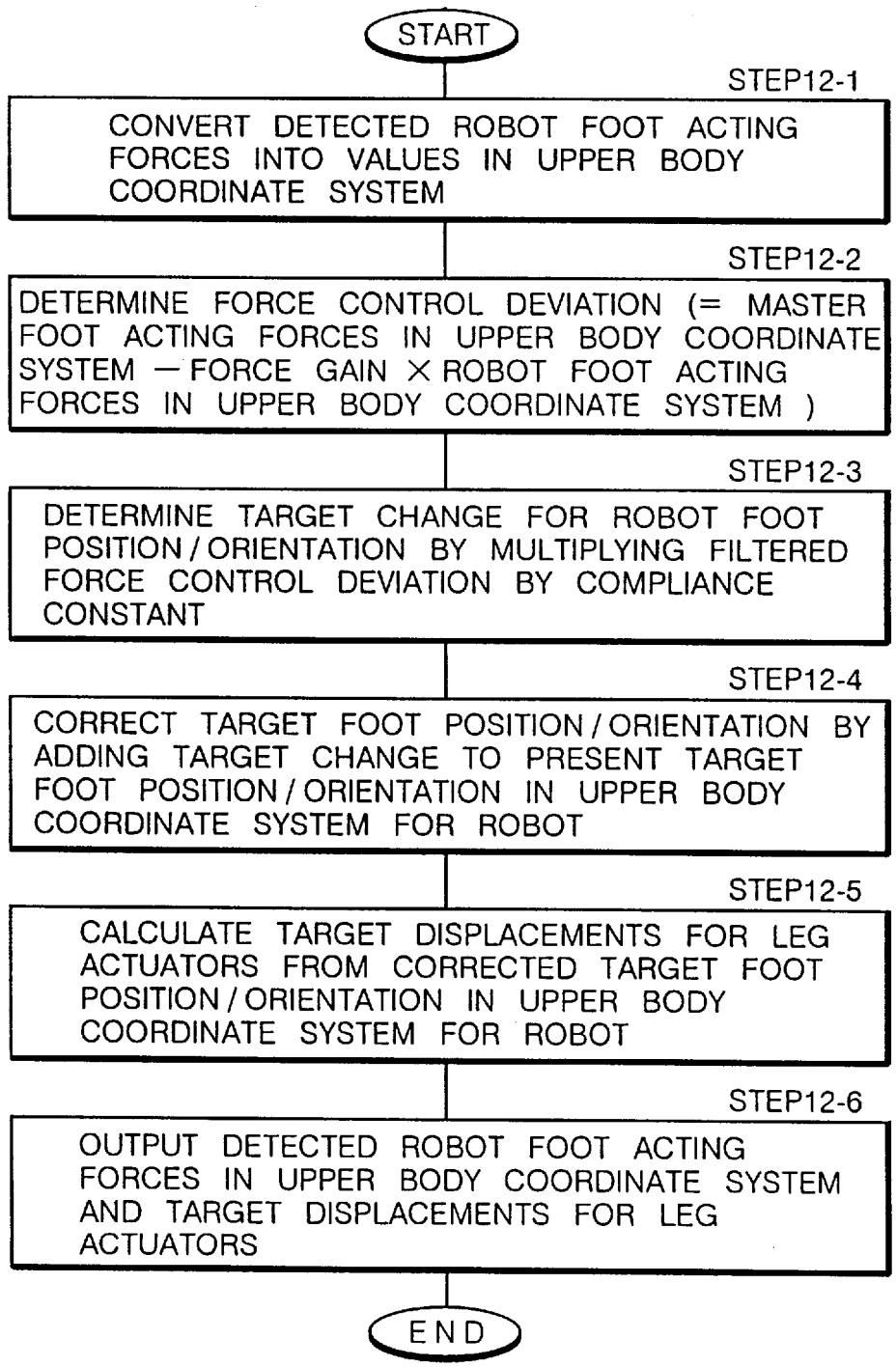
FIG. 12 is a flowchart of an operation sequence of a control system section for a legged moving robot controlled by a remote control system according to a fourth embodiment of the present invention.

In the fourth embodiment, the detected master foot acting forces in the master upper body coordinate system which are determined in the master control unit are transmitted to the robot control unit 11 from time to time, and the robot leg main controller 50 of the robot control unit 11 executes an operation sequence shown in FIG. 12.

The robot leg main controller 50 converts the robot foot acting forces detected by the six-axis force sensors 6 combined with the legs 3 into values in the robot upper body coordinate system in STEP12-1. Then, the robot leg main controller 50 determines, in STEP12-2, the deviation (referred to as a force control deviation) which is used to determine the target translation speed and the target rotation speed for the feet 7 of the robot R in the previous embodiments, from the detected master foot acting forces in the master upper body coordinate system which have been given from the master control unit 40 and the detected robot foot acting forces in the robot upper body coordinate system which have been determined in STEP12-1. Specifically, the force control deviation is determined according to the equation (2):

> Force control deviation=master foot acting forces in the upper body coordinate system−force gain×robot foot acting forces in the upper body coordinate system (2)

The robot leg main controller 50 multiplies a value which is produced by making the force control deviation blunt with a filter (not shown), by a compliance constant of the compliance control process for thereby determining a change for the robot foot position/orientation in STEP12-3. Specifically, the robot leg main controller 50 multiplies force and moment components of the value which is produced by making the force control deviation blunt with the non-illustrated filter, by the compliance constant to determine a target translation speed and a target rotation speed for the feet 7, and multiplies the target translation speed and the target rotation speed by the period of the control cycle for thereby determining a target change for the foot position/orientation of the robot R.

Then, the robot leg main controller 50 adds the target change determined in STEP12-3 to the present target foot position/orientation for the robot R in the robot upper body coordinate system which has been given from the master control unit 40 for thereby correcting the target foot position/orientation for the robot R in STEP12-4. The robot leg main controller 50 calculates target displacements for the leg actuators 5 of the robot R from the corrected target foot position/orientation in STEP12-5. The robot leg main controller 50 then outputs the calculated target displacements to the robot leg actuator displacement controller 51, and also outputs the detected robot foot acting forces in the robot upper body coordinate system which have been determined in STEP12-1 to the master control unit 40 in STEP12-6. The operation sequence executed by the robot leg main controller 50 is now finished.

The robot leg actuator displacement controller 51 controls the leg actuators 5 according to the supplied target displacements through a feedback loop.

According to the fourth embodiment, since the robot foot acting forces are compliance-controlled at a target value that is equal to the master foot acting forces/force gain, by the control unit 11 of the robot R itself, the robot foot acting forces and the master foot acting forces can be controlled more accurately so as to be associated with each other in a predetermined relationship.

If the feet 7 of the robot R are movable with seven or more degrees of freedom, then the above compliance control process may be employed together with the process which employs the Jacobian according to the third embodiment described above.

In each of the above embodiments described above, the master foot acting forces and the robot foot acting forces are detected respectively by the six-axis force sensors 29 and the six-axis force sensors 6. However, sensors may be added to detect drive forces produced by the master foot actuators 30 combined with the foot support mechanism 15 and drive forces produced by the leg actuators 5 of the robot R, and the master foot acting forces and the robot foot acting forces may be detected from the drive forces detected by these added sensors. Alternatively, a matrix of pressure sensors may be mounted on each of the foot support bases 28 of the master unit and the soles of the feet 7 of the robot R, and the master foot acting forces and the robot foot acting forces may be detected from output signals from the pressure sensors.

Although certain preferred embodiments of the present invention have been shown and described in detail, it should be understood that various changes and modifications may be made therein without departing from the scope of the appended claims.

What is claimed is:

1. A remote control system for remotely controlling a legged moving robot, comprising:

a master unit for manipulating the legged moving robot in a master-slave configuration;

said master unit having a foot support mechanism for movably supporting a foot of an operator, a foot support mechanism actuating device for actuating said foot support mechanism, an upper body support mechanism for supporting an upper body of the operator, and master foot acting force detecting means for detecting forces acting on the foot of the operator;

said legged moving robot having robot foot acting force detecting means for detecting forces acting on a foot of the legged moving robot from a floor, and a leg actuating device; and foot position/orientation control means for determining a target position and/or orientation for the foot of the operator with respect to the upper body thereof and a target position and/or orientation for the foot of the robot with respect to the upper body thereof, based on the forces detected by said master foot acting force detecting means and the forces detected by said robot foot acting force detecting means, in order to associate the forces acting on the foot of the operator and the forces acting on the foot of the legged moving robot with respect to each other in a predetermined relationship, controlling said foot support mechanism with said foot support mechanism actuating device according to the determined target position and/or orientation for the foot of the operator and the determined target position and/or orientation for the foot of the robot, and controlling said leg actuating device of the legged moving robot.

2. A remote control system according to claim 1, wherein said upper body support mechanism is disposed for movement in unison with the upper body of the operator;

said master unit having an upper body support mechanism actuating device for actuating said upper body support mechanism;

said legged moving robot having orientation tilt detecting means for detecting an orientation tilt of the upper body of the legged moving robot; and said remote control system further comprising master upper body position/orientation control means for determining a target position and/or orientation for the upper body of the operator supported by said upper body support mechanism based on the orientation tilt of the upper body of the legged moving robot which is detected by said orientation tilt detecting means, in order to achieve an orientation tilt of the upper body of the operator depending on the orientation tilt of the upper body of the legged moving robot, and controlling said upper body support mechanism with said upper body support mechanism actuating device according to the determined target position and/or orientation for the upper body of the operator.

3. A remote control system according to claim 1, wherein said foot position/orientation control means comprises means for determining a translation speed and/or rotation speed of the foot of said legged moving robot, from time to time, depending on a deviation from said predetermined relationship in which the forces detected by said master foot acting force detecting means and the forces detected by said robot foot acting force detecting means are associated with each other, determining a target position and/or orientation for the foot of the legged moving robot based on said translation speed and/or rotation speed, and determining a target position and/or orientation for the foot of the operator which corresponds to the determined target position and/or orientation for the foot of the legged moving robot.

4. A remote control system according to claim 1, wherein said foot position/orientation control means comprises means for determining a translation speed and/or rotation speed of the foot of said operator, from time to time, depending on a deviation from said predetermined relationship in which the forces detected by said master foot acting force detecting means and the forces detected by said robot foot acting force detecting means are associated with each other, determining a target position and/or orientation for the foot of the operator based on said translation speed and/or rotation speed, and determining a target position and/or orientation for the foot of the legged moving robot which corresponds to the determined target position and/or orientation for the foot of the operator.

5. A remote control system according to claim 1, wherein said foot position/orientation control means comprises means for determining a translation speed and/or rotation speed of the foot of said legged moving robot and a translation speed and/or rotation speed of the foot of said operator, from time to time, depending on a deviation from said predetermined relationship in which the forces detected by said master foot acting force detecting means and the forces detected by said robot foot acting force detecting means are associated with each other, and determining a target position and/or orientation for the foot of the legged moving robot and a target position and/or orientation for the foot of the operator based on said translation speed and/or rotation speed of the foot of said legged moving robot and said translation speed and/or rotation speed of the foot of said operator.

6. A remote control system according to any one of claims 1 through 5, wherein said legged moving robot has means for correcting the position and/or orientation of the foot of said legged moving robot according to a compliance control process in order to associate the forces acting on the foot of the operator and the forces acting on the foot of the legged moving robot with respect to each other in said predetermined relationship, depending on a deviation from said predetermined relationship in which the forces detected by said master foot acting force detecting means and the forces detected by said robot foot acting force detecting means are associated with each other.

* * * * *